United States Patent
Lamego et al.

(10) Patent No.: US 11,574,478 B2
(45) Date of Patent: Feb. 7, 2023

(54) MACHINE PERCEPTION USING VIDEO/IMAGE SENSORS IN AN EDGE/SERVICE COMPUTING SYSTEM ARCHITECTURE

(71) Applicant: Microsoft Technology Licensing, LLC, Redmond, WA (US)

(72) Inventors: Andre Lamego, Bellevue, WA (US); Suraj T. Poozhiyil, Redmond, WA (US); Juliette Danielle Weiss, Kirkland, WA (US); Vishal Sood, Kirkland, WA (US); Temoojin Chalasani, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 16/916,689

(22) Filed: Jun. 30, 2020

(65) Prior Publication Data
US 2021/0406557 A1    Dec. 30, 2021

(51) Int. Cl.
| | | |
|---|---|---|
| *G06V 10/25* | (2022.01) | |
| *G06V 20/52* | (2022.01) | |
| *G06N 20/00* | (2019.01) | |
| *G06V 40/20* | (2022.01) | |

(52) U.S. Cl.
CPC ............ *G06V 20/53* (2022.01); *G06N 20/00* (2019.01); *G06V 10/25* (2022.01); *G06V 40/23* (2022.01)

(58) Field of Classification Search
CPC ........ G06V 10/25; G06V 20/52; G06V 40/23; G06V 20/53; G06N 20/00
See application file for complete search history.

(56) References Cited

U.S. PATENT DOCUMENTS

| | | |
|---|---|---|
| 8,170,909 B2 | 5/2012 | Brown et al. |
| 9,426,428 B2 | 8/2016 | Renkis |
| 2006/0227862 A1 | 10/2006 | Campbell et al. |

(Continued)

FOREIGN PATENT DOCUMENTS

| | | |
|---|---|---|
| EP | 3619642 A1 | 3/2020 |

OTHER PUBLICATIONS

Liciotti, et al., "Shopper Analytics: A Customer Activity Recognition System Using a Distributed RGB-D Camera Network", In Conference of Video Analytics for Audience Measurement, Aug. 2014, 13 Pages.

(Continued)

*Primary Examiner* — Syed Haider
(74) *Attorney, Agent, or Firm* — Christopher J. Volkmann; Kelly, Holt & Christenson, PLLC

(57) ABSTRACT

An edge computing system is deployed at a physical location and receives an input from one or more image/video sensing mechanisms. The edge computing system executes artificial intelligence image/video processing modules on the received image/video streams and generates metrics by performing spatial analysis on the images/video stream. The metrics are provided to a multi-tenant service computing system where additional artificial intelligence (AI) modules are executed on the metrics to execute perception analytics. Client applications can then be run on the output of the AI modules in the multi-tenant service computing system.

20 Claims, 21 Drawing Sheets

(56) References Cited

U.S. PATENT DOCUMENTS

| | | | | |
|---|---|---|---|---|
| 2008/0298571 | A1* | 12/2008 | Kurtz | G06F 3/017 |
| | | | | 348/E7.083 |
| 2018/0150738 | A1* | 5/2018 | Harvey | F41A 17/063 |
| 2019/0122082 | A1* | 4/2019 | Cuban | G09G 3/20 |
| 2020/0020113 | A1 | 1/2020 | Buibas et al. | |
| 2020/0225815 | A1* | 7/2020 | Ventura | H04N 21/47 |
| 2021/0398691 | A1* | 12/2021 | Dhamija | G16H 50/80 |

OTHER PUBLICATIONS

"International Search Report and Written Opinion Issued in PCT Application No. PCT/US21/033950", dated Sep. 7, 2021, 12 Pages.

Tian, et al., "IBM Smart Surveillance System (S3): Event Based Video Surveillance System with an Open and Extensible Framework", In Journal of Machine Vision and Applications, vol. 19, Issue 5, Jun. 24, 2008, 31 Pages.

"What's ROI (Region of Interest) Video Surveillance Technology?", Retrieved From: https://www.unifore.net/ip-video-surveillance/briefly-introducing-roi-region-of-interest-video-surveillance.html, Oct. 23, 2015, 9 Pages.

"Eagle Eye Video API Platform Augmented to Support Advanced System Integration", Retrieved From: https://www.sourcesecurity.com/news/eagle-eye-video-api-platform-advanced-system-integration-co-12058-ga-npr.1516885201.html, Jan. 25, 2018, 5 Pages.

"Genetec Inc. Introduces New Retail Intelligence Application Using Retailers' Existing In-Store Surveillance Cameras", Retrieved From: https://www.genetec.com/about-us/news/press-center/press-releases/genetec-inc-introduces-new-retail-intelligence-application-using-retailers-existing-in-store-surveillance-cameras, Jan. 11, 2017, 3 Pages.

"IntelliVision Launches Video Analytics Channel Partner Program", Retrieved From: https://www.intelli-vision.com/news/intellivision-launches-video-analytics-channel-partner-program/, Nov. 28, 2018, 4 Pages.

"Smart Retail", Retrieved From: https://web.archive.org/web/20190323153833/https:/www.intelli-vision.com/smart-retail/, Mar. 23, 2019, 5 Pages.

Bigelow, John, "In-store CCTV Expands from Monitoring Security to Boosting Sales", Retrieved From: https://www.securitysolutionsmedia.com/2018/04/27/in-store-cctv-expands-from-monitoring-security-to-boosting-sales/, Apr. 27, 2018, 2 Pages.

Zhang, et al., "The Design and Implementation of a Wireless Video Surveillance System", In Proceedings of the 21st Annual International Conference on Mobile Computing and Networking, Sep. 7, 2015, pp. 426-438.

* cited by examiner

MACHINE PERCEPTION USING VIDEO/IMAGE SENSORS IN AN EDGE/SERVICE COMPUTING SYSTEM ARCHITECTURE

BACKGROUND

Computing systems are currently in wide use. Some computing systems host services, such as multi-tenant services that are accessed by tenant users. In these types of systems, tenants often correspond to organizations that have applications or solutions deployed on the multi-tenant service computing system so that tenant data can be accessed and processed using those applications and/or solutions.

Some organizations that use multi-tenant services may have one or more separate physical locations. Each of those locations may deploy one or more different security cameras or other image/video capturing or sensing mechanisms. Such cameras or sensors may be relatively simple devices that provide a video stream, or stream of images that are captured by the device, to a display system. These images or video streams are often displayed for a user who may provide security services for the location.

If more complex image processing is to be performed on the images or video streams generated by these types of cameras or sensors, the images or video streams are often provided to a remote server environment (such as a cloud-based environment) where the image processing is performed. Some current systems also provide relatively high complexity, special-purpose cameras which perform some of the processing themselves. Such cameras often need to be deployed in addition to, or instead of, the security cameras. Similarly, in some current systems, such sensors or cameras can have specialized chip sets deployed thereon, which can increase the cost of the cameras dramatically.

The discussion above is merely provided for general background information and is not intended to be used as an aid in determining the scope of the claimed subject matter.

SUMMARY

An edge computing system is deployed at a physical location and receives an input from one or more image/video sensing mechanisms. The edge computing system executes artificial intelligence image/video processing modules on the received image/video streams and generates metrics by performing spatial analysis on the images/video stream. The metrics are provided to a multi-tenant service computing system where additional artificial intelligence (AI) modules are executed on the metrics to execute perception analytics. Client applications can then be run on the output of the AI modules in the multi-tenant service computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
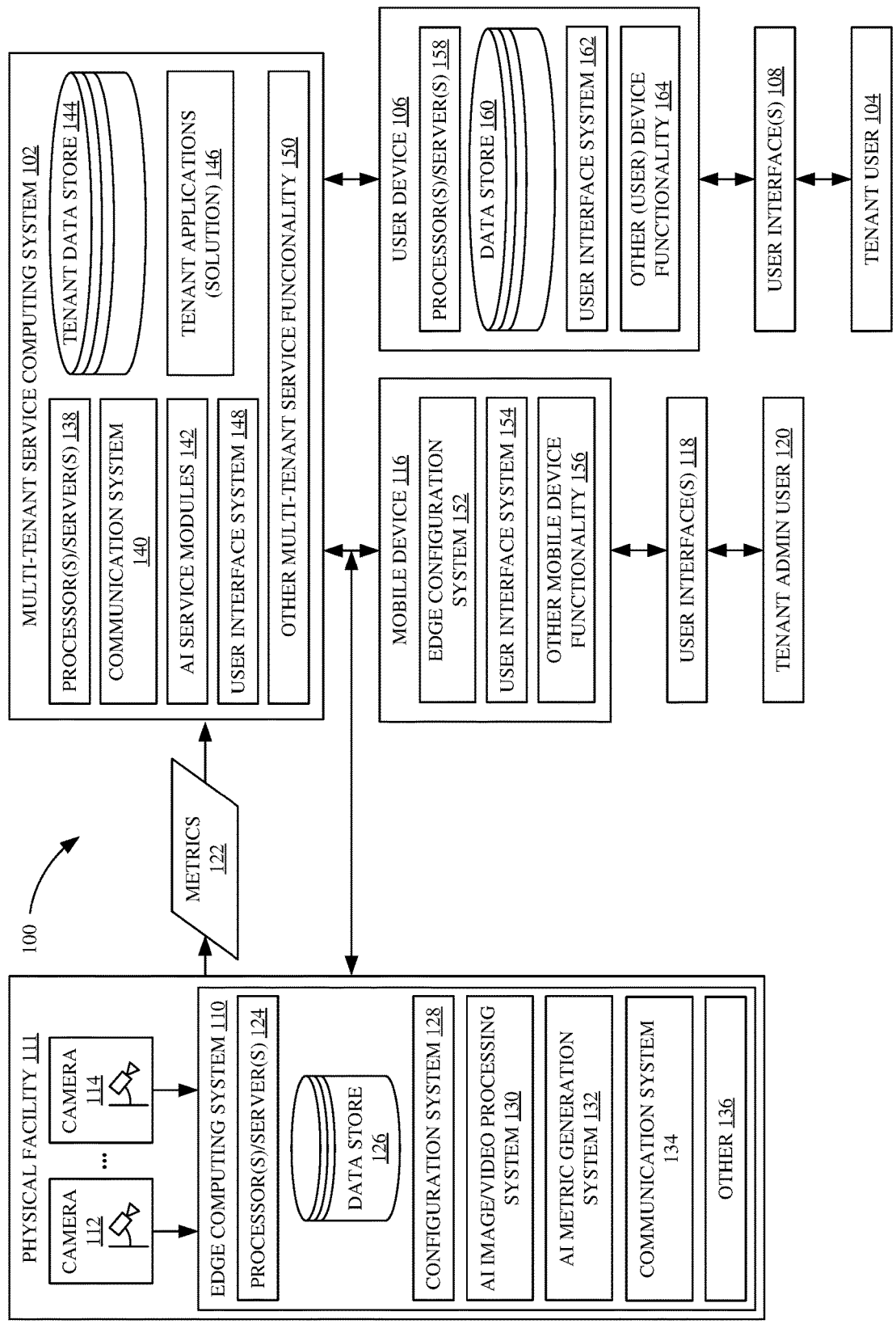
FIG. 1 is a block diagram of one example of a computing system architecture.

FIG. 1 is a block diagram of one example of a computing system architecture 100. Architecture 100 includes a multi-tenant service computing system 102 that can be accessed by a tenant user 104 either directly, or using a user device 106. FIG. 1 shows that user device 106 generates user interfaces 108 that tenant user 104 can interact with in order to control various portions of user device 106 and multi-tenant service computing system 102.

Architecture 100 also includes an edge computing system 110 that is connected to one or more cameras 112-114. In the example shown in FIG. 1, edge computing system 110 and cameras 112-114 are deployed at a physical location or facility 111 that may correspond to an organization that tenant user 104 is associated with.

Also, in FIG. 1, a mobile device 116 can generate user interfaces 118 that a tenant administrative user 120 can interact with in order to control various portions of mobile device 116, multi-tenant service computing system 102 and/or edge computing system 110. Briefly, by way of overview, tenant administrative user 120 uses mobile device 116 (or another device) in order to configure edge computing system 110 to analyze certain portions of images or video streams generated by cameras 112-114 to identify different types of events. Edge computing system 110 then uses artificial intelligence modules to generate metrics 122 and provides those metrics to multi-tenant computing system 102. Multi-tenant computing system 102 can use additional artificial intelligence modules to perform further processing on metrics 122, which can be surfaced, through tenant applications, to tenant user 104. Before describing the overall operation of architecture 100 in more detail, a brief description of some of the items in architecture 100, and their operation, will first be provided.

Edge computing system 110 illustratively includes one or more processors or servers 124, data store 126, a configuration system 128, artificial intelligence (AI) image/video processing system 130, AI metric generation system 132, communication system 134, and it can include a wide variety of other edge computing system functionality 136. Multi-tenant service computing system 102 can include one or more processors or servers 138, communication system 140, AI service modules 142, one or more tenant data stores 144, one or more tenant applications (or solutions) 146, user interface system 148, and it can include a wide variety of other multi-tenant service functionality 150.

Mobile device 116 can include edge configuration system 152, user interface system 154, and a wide variety of other mobile device functionality 156. User device 106 can include one or more processors or servers 158, data store 160, user interface system 162, and it can include a wide variety of other user device functionality 164.

In one example, edge configuration system 152 on mobile device 116 interacts with configurations system 128 on edge computing system 110. The configuration systems 152 and 128 allow tenant administrative user 120 to select the different cameras 112-114 that are plugged into edge computing system 110. Configuration system 128 allows tenant administrative user 120 to select a camera that has a field of view that covers an area of interest (such as an entryway, a display area for displaying goods at the location, a queue area where queues of people form, a server area where the people in the queues are eventually served, among other things). Tenant admin user 120 is then provided with a display mechanism that allows the tenant admin user 120 to define an area or portion, within the field of view of the selected camera, which defines the area of interest. This can be done by manipulating polygons that are overlaid on the field of view of the camera, or in other ways.

Once the areas of interest on the different fields of view of cameras 112-114 have been identified, then AI image/video processing system 130 can receive the video streams or images from cameras 112-114 and uses artificial intelligence and machine learning modules to perform image processing on the areas of interest (e.g., zones of interest) defined in the fields of view of the cameras. AI image/video processing system 130 can be configured to detect different events, such as whether a person enters a zone of interest, exits the zone of interest, crosses a line of interest (which may define the entry/exit point of the physical location), identify the direction that the person entered or exited a zone of interest, among other things. AI metric generation system 132 then uses artificial intelligence and machine learning modules to perform further perception analytics on the events detected by AI image/video processing system 130. For example, AI metric generation system 132 can aggregate the events and thus count them, calculate the number of different events that occur in the different zones of interest, over different timeframes, among other things. AI metric generation system 132 outputs the metrics 122 to communication system 134 which communicates the metrics 122 to multi-tenant service computing system 102. Because the metrics 122 are transferred by communication system 134 to multi-tenant service computing system 102, instead of all of the images or video streams from cameras 112-114, this greatly reduces the bandwidth and time required to transmit information from edge computing system 110 to multi-tenant service computing system 102. Also, because edge computing system 110 performs AI processing on the image/video stream(s), this reduces the computing and time resources needed by system 102 to perform its processing.

In one example, metrics 122 are transmitted over a network, which can be a wide area network, a local area network, a near field communication network, a cellular communication network, or any of a wide variety of other networks or combinations of networks. Thus, communication systems 134 and 140 are illustratively configured to enable communication among the various items on edge computing system 110 and multi-tenant service computing system 102, respectively, and to enable communication between systems 110 and 102.

Once the metrics 122 are received by communication system 140, they are provided to AI service modules 142. Modules 142 can perform a wide variety of different types of artificial intelligence and machine learning processing on the metrics 122. For instance, they can generate aggregations, sums, averages, deltas, maximums/minimums, percent and absolute change values, ranks, comparisons among a wide variety of other things. This information can then be stored in tenant data stores 144 where it can be accessed by tenant applications (or solutions) 146. Tenant users 104 can submit queries or access the information using user device 106, and the information can be surfaced to user device 106 through user interface system 148. It can then be surfaced for tenant user 104 on user interfaces 108 by user interface system 162. Thus, tenant user 104 can have access to a wide variety of different types of reports, interactive information, displays, etc. that shows traffic patterns, queue management, and display effectiveness, for one or more different physical locations or facilities, among a wide variety of other things.

Figure 2:
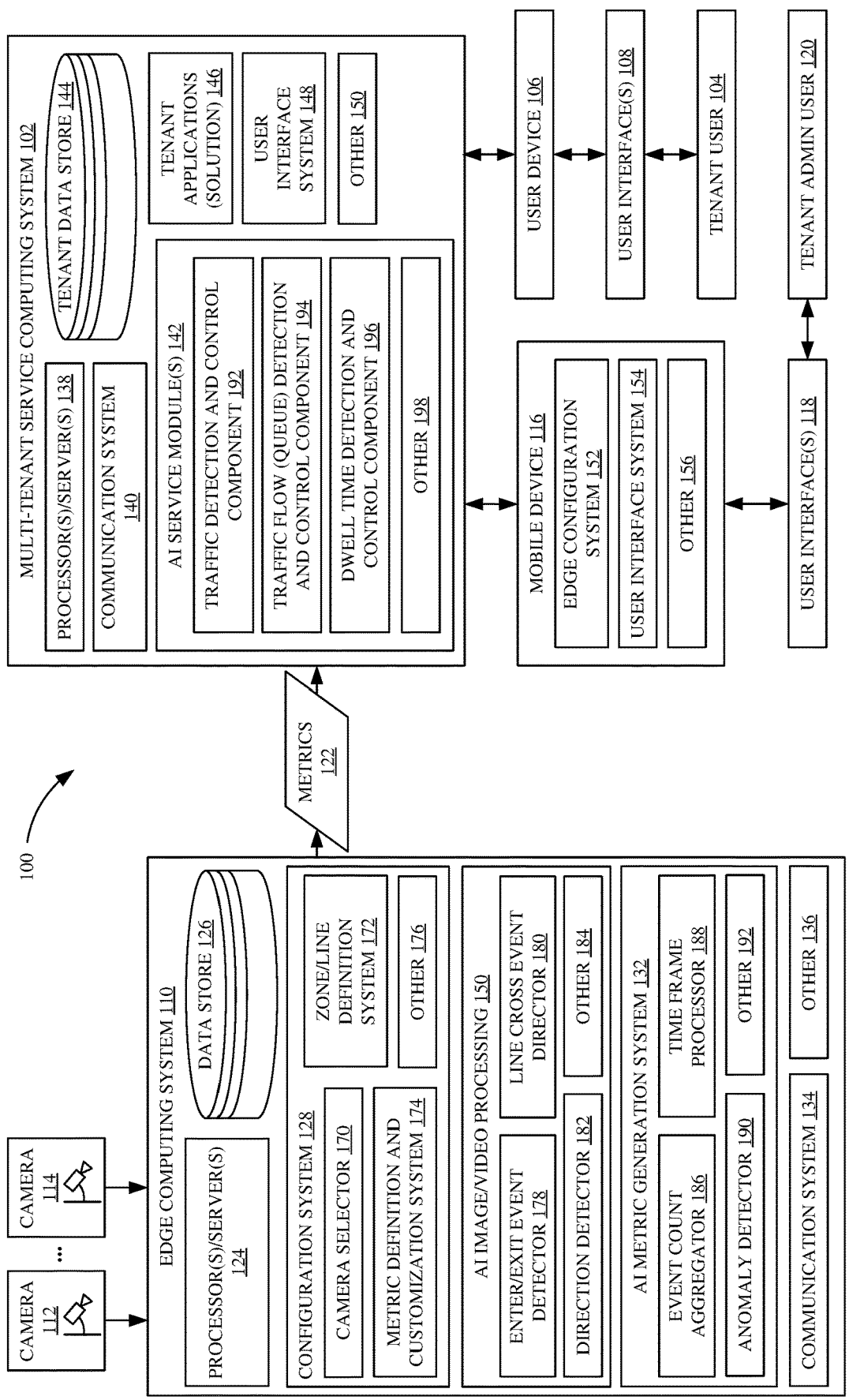
FIG. 2 is a block diagram showing the computing system architecture illustrated in FIG. 1, in more detail.

FIG. 2 is a block diagram showing one example of the architecture 100, illustrated in FIG. 1, with certain parts of the architecture 100 shown in more detail. Similar items are similarly numbered in FIGS. 1 and 2, but FIG. 2 shows AI image/video processing system 130, AI metric generation system 132, configurations system 128, and AI service modules 142 in more detail. In the example shown in FIG. 2, configuration system 128 includes camera selector 170, zone/line definition system 172, metric definition and customization system 174, and it can include other items 176. AI image/video processing system 130 includes enter/exit event detector 178, line cross event detector 180, direction detector 182, and it can include other items 184. AI metric generation system 132 can include event count aggregator 186, timeframe processor 188, anomaly detector 190, and it can include other items 192. AI service modules 142 on multi-tenant service computing system 102, can include traffic detection and control component 192, traffic flow (queue) detection and control component 194, dwell time detection and control component 196, and it can include other items 198.

Camera selector 170 illustratively authenticates to cameras 112-114 and surfaces a representation of the different cameras 112-114 that are connected to edge computing system 110, to tenant admin user 120 of mobile device 116. Camera selector 170 allows user 120 to select one of the cameras for defining a line/zone of interest in the field of view of the selected camera.

Zone/line definition system 172 illustratively surfaces a field of view of the selected camera to tenant admin user 120 and provides a mechanism by which tenant admin user 120 can define a zone or line of interest within the field of view of the selected camera. For instance, if the selected camera has a field of view of a server location (e.g., a cashier location), as well as a queue location, then tenant admin user 120 can use the zone/line definition mechanism to define the zones of interest (e.g., the queue zone, the server zone, etc.) that will be used by AI image processing system 130 to detect events in those areas of interest. In addition, if the zone of interest is an entry point to a location, then tenant admin user 120 can use definition system 172 to define a line so that when a person crosses the line in one direction, they are deemed to have entered the location, and when a person crosses the line in another direction, they are deemed to have exited the location. These and other examples of zone and line configuration are described in greater detail below.

Metric definition and customization system 174 surfaces a user experience that allows tenant admin user 120 to define the types of events that the user wants system 130 to detect in the zones and lines of interest, and it allows tenant admin user 120 to customize the zones and lines of interest. For instance, it can allow user 120 to name the entry/exit location, the zone of interest, a line of interest, among other things.

AI image/video processing system 130 processes the images and videos to detect events based upon the optical and perception analysis of the images and videos. To do this, system 130 can use machine perception and computer vision techniques. Enter/exit event detector 178 detects enter and exit events. For instance, when a person enters a defined zone then enter/exit event detector 178 detects an enter event. When a person exits a defined zone then detector 178 detects an exit event. Line crossing event detector 180 detects when a person crosses a defined line. Direction detector 182 can detect the direction that a person is moving in the video or image. For instance, if the person crosses a line entering a location and moves to the left, this can be detected. The same can be detected if the person moves in a generally central direction or in a rightward direction. Similarly, direction detector 182 can detect the direction from which a person enters a zone or the direction the person takes upon exiting a zone. AI image/video processing system 130 can also use machine perception and computer vision techniques to detect the presence of, and movement of, a person relative to the zone interest, and then use an artificial intelligence classifier (such as a neural network, a Bayesian classifier, etc.) to identify the type of event that occurred (entry/exit, line crossing, direction, etc.).

All of these detected events are provided to AI metric generation system 132 which generates various metrics based upon the detected events. Timeframe processor 188 can set various timeframes over which the metrics are generated. For instance, count aggregator 186 can aggregate the different types of events detected in system 130, and correlate them to the different zones or lines where the events were detected, and aggregate those events over a timeframe that is set by timeframe processor 188. When performing queue management, for example, it may be helpful to know how many people entered a queue zone (where a queue normally forms) and how many people exited the queue zone over a specific timeframe. This can indicate the average number of people in the queue over that timeframe. This is just one metric and a wide variety of others are discussed in more detail below. Anomaly detector 190 illustratively detects anomalies in the events, or in the data provided by system 130.

Communication system 134 then transmits then metrics 122 to communication system 140 in multi-tenant service computing system 102. The metrics 122 can be stored on a tenant-specific basis in tenant data store 144. They can also be provided to AI service modules 142 for further processing. Traffic detection and control component 192 can illustratively generate information indicative of the traffic at the physical location 111 where cameras 112-114 and edge computing system 110 are located. It can combine that information with data from other locations to generate additional insights. Component 192 can generate information indicative of trends, patterns, changes, anomalies, etc. at the store entry and exit points. It can generate information indicative of such things as how many people visited the location during a given timeframe, what direction visitors initially take once they enter the location, what the average occupancy of the location is during a given timeframe, among other things. It can also generate information indicative of a comparison of metrics of the location traffic across spatial regions. For instance, it can compare the traffic at one entrance/exit location in the physical facility with the traffic from a second entry/exit location. It can generate this information and these comparisons over multiple different timeframes for a single facility, over multiple different timeframes and for multiple different facilities, among other things.

Traffic flow (queue management) detection and control component 194 illustratively generates insight information relating to dwell time (the amount of time a person spent in a queue), trends, patterns, changes, anomalies, etc. with respect to the different zones that have been configured and identified as queue zones (areas where queues normally form). It can generate information indicative of things such as the longest queue length, the shortest queue length, the peak line length across all queues, the longest queue wait time, the shortest queue wait time, the average queue wait time across all queues, the average serve time across all queues, the number of visitors each queue left unserved (where a visitor entered the queue and exited the queue without going to a server location).

Dwell time detection and control component 196 can be used to generate information indicative of visitor dwell times in different zones within the physical facility. For instance, if the physical facility is a store, there may be zones that are defined as display zones, near end caps, promotional displays, and other displays. It can surface information indicative of how effective a display is. It can surface information, for instance, indicative of how many people passed the display, how many people visited the display, how long, on average, did people dwell at the display, whether the display was engaging (e.g., by comparing the dwell time in the display zone to a threshold dwell time), the direction (which side of the display zone) the visitor entered or exited the display zone. It can compare metrics of different display effectiveness across different displays, at different times, at different days of the week, month, year, etc. It can also generate comparisons of this information to displays in other physical facilities. All of the information generated by the AI service modules 142 can also be stored in tenant data store 144. Tenant applications (solutions) 146 may be generated and configured so that user 104 can access the tenant data in tenant data store 144 to surface desired information. Some representations of that information, as can be surfaced by tenant applications 146, are described in greater detail below.

Figure 3:
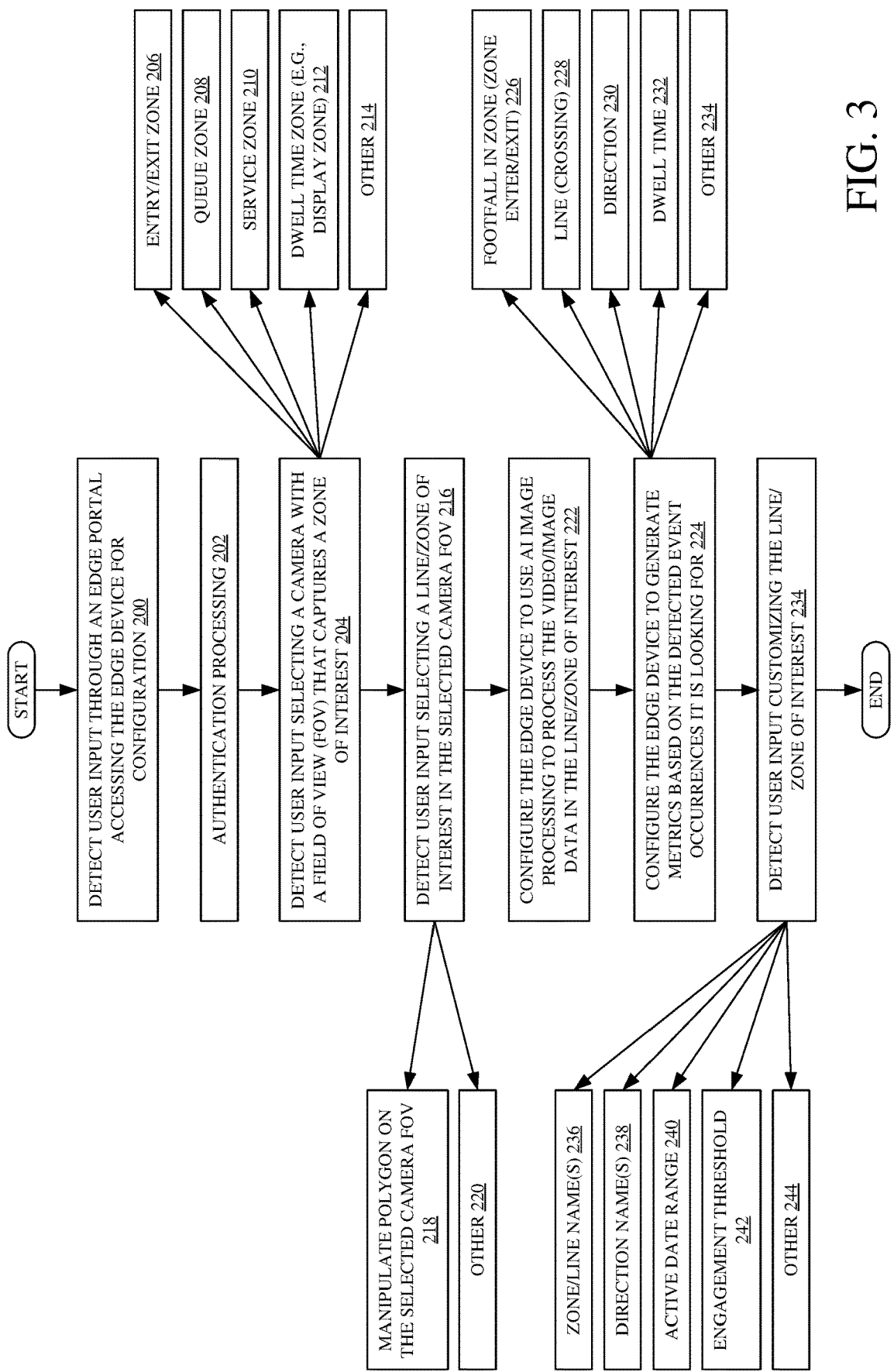
FIG. 3 is a flow diagram showing one example of configuring an edge computing system.

FIG. 3 is a flow diagram illustrating one example of the operation of configuration system 128, in allowing tenant admin user 120 to configure edge computing system 110, in more detail. Communication system 134 detects a user input, from tenant admin user 120, through an edge portal, accessing the edge computing system 110 for configuration. This is indicated by block 200 in the flow diagram of FIG. 3. In one example, configuration system 152 on mobile device 116 enables tenant admin user 120 to access configuration system 128 on edge computing system 110 either through an edge configuration portal. This can be done either through multi-tenant service computing system 102, or directly with edge computing system 110. The input indicates that tenant admin user 120 wishes to configure the edge computing system 110.

Configuration system 128 then performs authentication processing in which it authenticates user 120 and identifies cameras 112-114 that are available for configuration. Performing authentication processing is indicated by block 202 in FIG. 3.

Camera selector 170 then identifies the particular cameras 112-114 that can be configured and generates an output indicative of those cameras. The output is provided through edge configuration system 152 on mobile device 116 to tenant admin user 120. Tenant admin user 120 then provides a user input selecting a camera, with a field of view that captures a zone of interest for configuration. Selecting a camera with a desired field of view is indicated by block 204 in the flow diagram of FIG. 3. In one example, the field of view of the camera covers an entry/exit zone of the physical facility where the camera is positioned. This is indicated by block 206. In another example, the field of view of the selected camera covers a queue zone where queues normally form in the physical facility. This is indicated by block 208. In another example, the camera field of view may cover a service zone, where service is provided for people in the physical facility. This may include, for instance, a cash register zone, a kiosk where the people can perform operations, among other things. Selecting a camera with a field of view that covers a service zone is indicated by block 210 in the flow diagram of FIG. 3. The selected camera may have a field of view that covers a dwell time zone, such as a zone adjacent a display, an end cap display, or another display or promotional area. Selecting a camera with a field of view that covers a dwell time zone is indicated by block 212. The camera may be selected where its field of view covers another zone or area of interest as well, and this is indicated by block 214.

Zone/line definition system 172 then generates an output that user 120 can interact with in order to select or define a line or a zone of interest, within the field of view of the selected camera. This is indicated by block 216 in the flow diagram of FIG. 3. For instance, zone/line definition system 172 can generate an interactive output in which a configurable polygon is overlaid, over the field of view of the camera. In that case, user 120 can manipulate the polygon (by rotating it, expanding its length and width, changing the angles of its corners, etc.), to define the zone of interest, within the field of view of the selected camera. Manipulating polygons overlaid on the selected camera field of view is indicated by block 218. System 172 can use other input mechanisms that user 120 can interact with in order to define a zone or line of interest in the field of view of the selected camera. This is indicated by block 220.

Metric definition and customization system 174 then provides an output that can be surfaced for user 120, and that user 120 can interact with in order to configure AI image/video processing system 130 to process the video/image data in the signals received from the selected camera, within the line or zone of interest that the user has just configured. For instance, user 120 can provide an input indicating that AI image/video processing system 130 is to detect exit and entry events, line crossing events, direction events, etc. In another example, metric definition and customization system 174 automatically configures system 130 to detect those events in the line or zone of interest that user 120 has just defined. Configuring the edge computing system 110 to use the AI image processing system 130 to process the video/image data corresponding to the line/zone of interest defined for the selected camera is indicated by block 222 in the flow diagram of FIG. 3.

Metric definition and customization system 174 also generates an output that user 120 can interact with in order to configure AI metric generation system 132 to generate metrics based upon the detected event occurrences that system 130 is looking for. This is indicated by block 224 in the flow diagram of FIG. 3. For instance, event count aggregator 186 can aggregate footfalls (the people count or occupancy of a person) in a zone of interest within a desired timeframe. This is indicated by block 226. Aggregator 186 can aggregate line crossing if a line of interest has been defined in the camera field of view. This is indicated by block 228. Aggregator 186 can aggregate direction events as indicated by block 230 and dwell time events as indicated by block 232. Aggregator 186 can aggregate other events over a timeframe controlled by timeframe processor 188 in other ways as well, and this is indicated by block 234. It will be noted that AI metric generation system 132 can be automatically configured to generate metrics for the detected events as well, without needing input from user 120.

Metric definition and configuration system 174 also illustratively generates a representation of a user interface mechanism that can be used by user 120 in order to customize the line or zone of interest that was just configured. This is indicated by block 234 in the flow diagram of FIG. 3. For instance, the mechanism may allow user 120 to input the zone or line name, as indicated by block 236, the direction name, as indicated by block 238, the active date range for the information, as indicated by block 240, or an engagement threshold as indicated by block 242. By engagement it is meant that the occupant is paying attention to the display. Engagement can be defined as a dwell time in a display zone of interest that meets a dwell time threshold. By way of example, if the person is dwelling in the display zone for at least 5 seconds, this may indicate that the person is engaged with the display (paying particular attention to the display). Thus, customizing the engagement threshold is indicated by block 242. Engagement may be defined as the person facing the display for a threshold time as well. In that case, the image/video processing detects the orientation of the person relative to the display. The system 174 can detect user inputs customizing the line/zone of interest in a wide variety of other ways as well, and this is indicated by block 234 in the flow diagram of FIG. 3.

Figure 4:
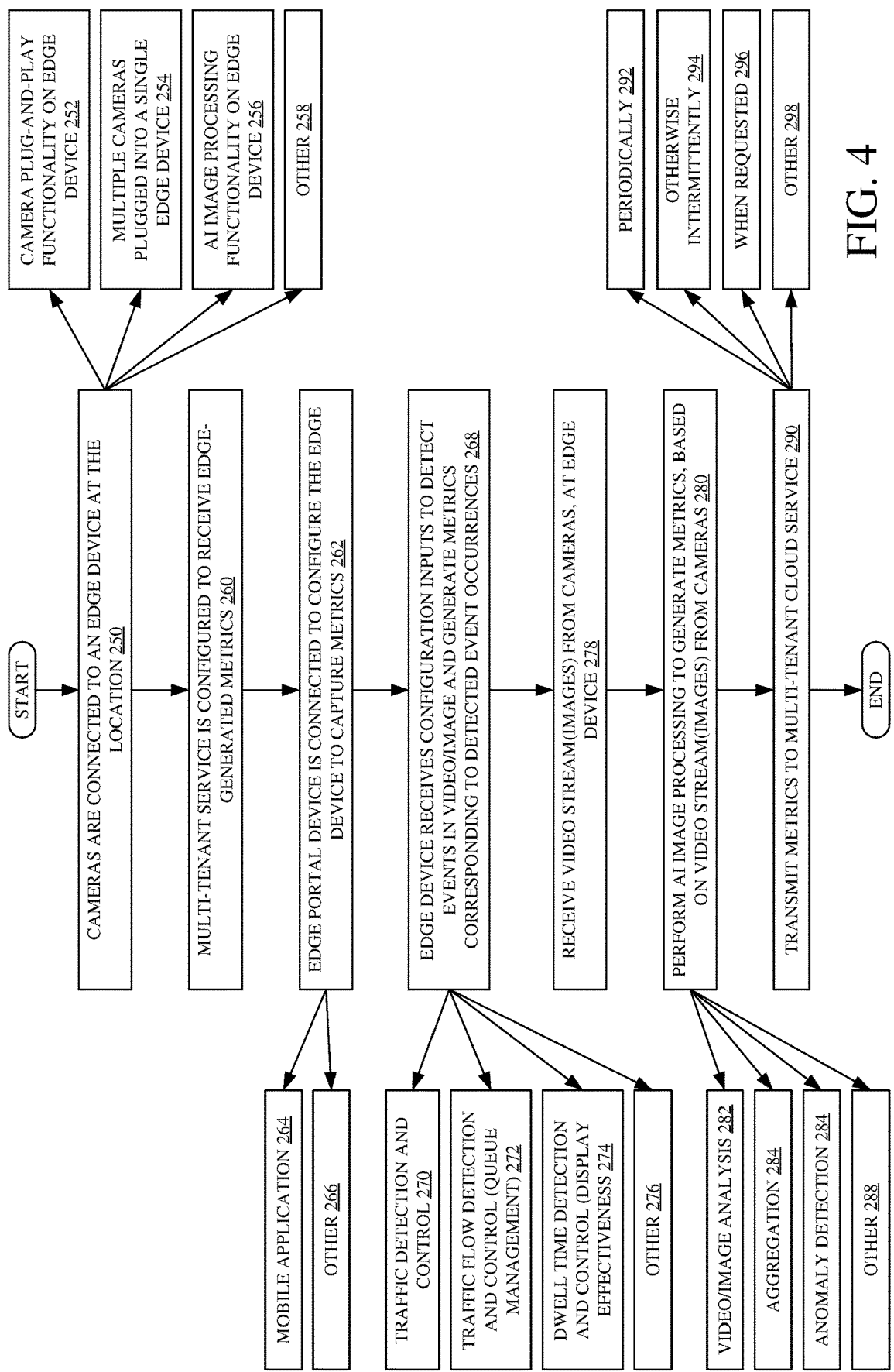
FIG. 4 is a flow diagram illustrating one example of the operation of the edge computing system shown in FIGS. 1 and 2.

FIG. 4 is a flow diagram illustrating the overall operation of edge computing system 110, once it has been configured to detect events within zones or lines of interest in the fields of view of the various cameras 112-114 that it is connected to. Thus, it is assumed that the cameras 112-114 are connected to edge computing system 110 at the physical location of the facility. This is indicated by block 250 in the flow diagram of FIG. 4. It will be noted that, in one example, configuration system 128 and AI image/video processing system 130 provide plug-and-play functionality for a wide variety of different types of cameras 112-114. Thus, functionality is provided to simply receive the images or video streams from the cameras and process them, without requiring a specialized format, a specialized chipset within the cameras, or any other specialized intelligence within the cameras. Providing this type of plug-and-play functionality on the edge device is indicated by block 252 in the flow diagram of FIG. 4.

Also, in one example, there are multiple cameras 112-114 plugged into a single edge computing system 110. In one example, for instance, there may be only a single edge computing system 110 for an entire physical facility 111 that may have many different cameras. Providing multiple cameras plugged into a single edge device is indicated by block 254 in the flow diagram of FIG. 4.

Also, it is assumed that the AI image/video processing system 130 and metric generation system 132 will be provided on edge computing system 110, so that all the raw video or image data need not be provided to multi-tenant service computing system 102 for this type of processing. Providing this type of processing functionality on the edge computing system 110 is indicated by block 256. The cameras and edge computing system 110 can be provided in other ways as well, and this is indicated by block 258.

It is also assumed that multi-tenant service computing system 102 is configured to receive the edge-generated metrics 122 for further processing. This is indicated by block 260 in the flow diagram of FIG. 4. Further, it is assumed that the edge portal device (e.g., mobile device 116) is connected to configure the edge computing system 110 to capture images and/or video, process those images and/or video, and generate metrics. This is indicated by block 262 in the flow diagram of FIG. 4. Having the edge portal device be a mobile device is indicated by block 264. Other devices can be used as an edge portal device as well, and this is indicted by block 266.

At some point, edge computing system 110 receives configuration inputs to detect events in video/images and to generate metrics corresponding to the detected event occurrences. This is indicated by block 268. The configuration process was described in greater detail above with respect to FIG. 3. For purposes of the present discussion, it will be assumed that AI image/video processing system 130 and AI metric generation system 132 are configured to use artificial intelligence modules to detect traffic detection and control events 270, traffic flow detection and control (queue management) events 272, dwell time detection and control (display effectiveness) events 274, and it can be configured to detect a wide variety of other events and generate metrics for those events as well, as indicated by block 276.

Once configured, edge computing system 110 receives video streams (or images) from the cameras 112-114. This is indicated by block 278. Those images or video are provided to AI image/video processing system 130 which performs artificial intelligence image processing, and to AI metric generation system 132 that uses artificial intelligence metric generators to generate metrics based upon the video stream (and/or images) from the cameras. This is indicated by block 280. In doing so, system 130 can perform video/image processing and analysis, as indicated by block 282. Aggregator 186 can perform aggregation on the events detected by system 130. This is indicated by block 284. Anomaly detector 190 can detect anomalies in the events that are detected by system 130. This is indicated by block 286. A wide variety of other video/image processing and metric generation can be done based on the images and/or video streams received from the cameras. This is indicated by block 288.

Once the metrics 122 are generated, by metric generation system 132, they are provided to communication system 134 which communicates them to multi-tenant service computing system 102. This is indicated by block 290 in the flow diagram of FIG. 4.

In one example, communication system 134 transmits metrics 122 periodically, as indicated by block 292 in the flow diagram of FIG. 4. They can also be transmitted otherwise intermittently, as indicated by block 294. For instance, once a certain threshold number of metrics have been generated over a certain threshold number of timeframes, it may be that communication system 134 is configured to, then, send metrics 122 to system 102. The metrics can be sent when requested by multi-tenant service computing system 102. For instance, communication system 134 can store the metrics in data store 126 until system 102 requests the metrics 122. This is indicated by block 296. The metrics can be sent from edge computing system 110 to multi-tenant service computing system 102 in other ways as well, and this is indicated by block 298.

Figure 5:
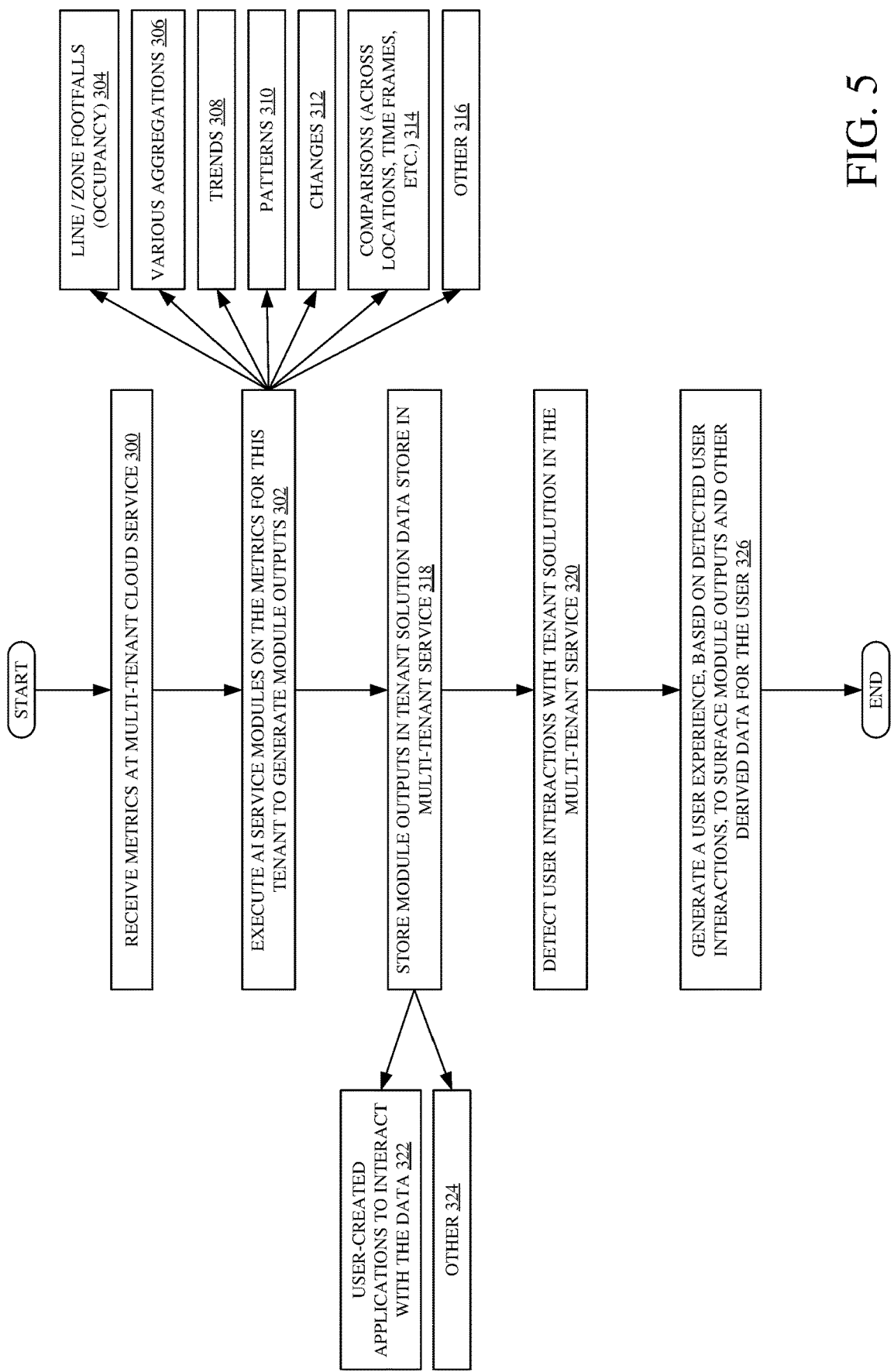
FIG. 5 is a flow diagram illustrating one example of the operation of the multi-tenant service computing system shown in FIGS. 1 and 2.

FIG. 5 is a flow diagram illustrating one example of the overall operation of multi-tenant service computing system 102, once it receives metrics 122 from edge computing system 110. Communication system 140 in multi-tenant service computing system 102 first receives the metrics 122 from an identified edge computing system 110. This is indicated by block 300 in the flow diagram of FIG. 5. The metrics are provided to AI service modules 142 which execute a plurality of different artificial intelligence service modules on the metrics for this particular tenant, in order to generate module outputs. This is indicated by block 302 in the flow diagram of FIG. 5. The AI service modules 142 can generate line/zone footfalls (or people count/occupancy) data, based on the metrics. This is indicated by block 304. Modules 142 can generate various aggregations 306, identify trends 308, patterns 310, changes 312 from previous data, comparisons (across physical locations, timeframes, etc.) as indicated by block 314, and a wide variety of other insights and model outputs, as indicated by block 316. Some examples of the operation of AI modules 142 is described in greater detail below.

AI service modules 142 generate the information and store it, for this particular tenant, in tenant data store 144. This is indicated by block 318 in the flow diagram of FIG. 5. The data is then accessible by the tenant applications (or solution) 146. Therefore, user interface system 148 can generate a representation of a user interface that can be surfaced for tenant user 104 on user device 106 so that tenant user 104 can access the data through tenant applications (or solution) 146.

Tenant user 104 thus interacts with user interfaces 108 in order to access the data. Detecting user interactions with the tenant solution (or applications) 146 in the multi-tenant service computing system 102 is indicated by block 320. The applications or solution 146 can be user-created applications that interact with the data, as indicated by block 322. They can be any of a wide variety of other applications or solutions as well, and this is indicated by block 324. Tenant applications 146 then use user interface system 148 to generate a user experience, based upon the detected user interactions requesting access to the data, to surface the module outputs from AI service modules 142 and other desired data for tenant user 104. Generating the user experience to surface the data is indicated by block 326 in the flow diagram of FIG. 5.

Figure 6A:
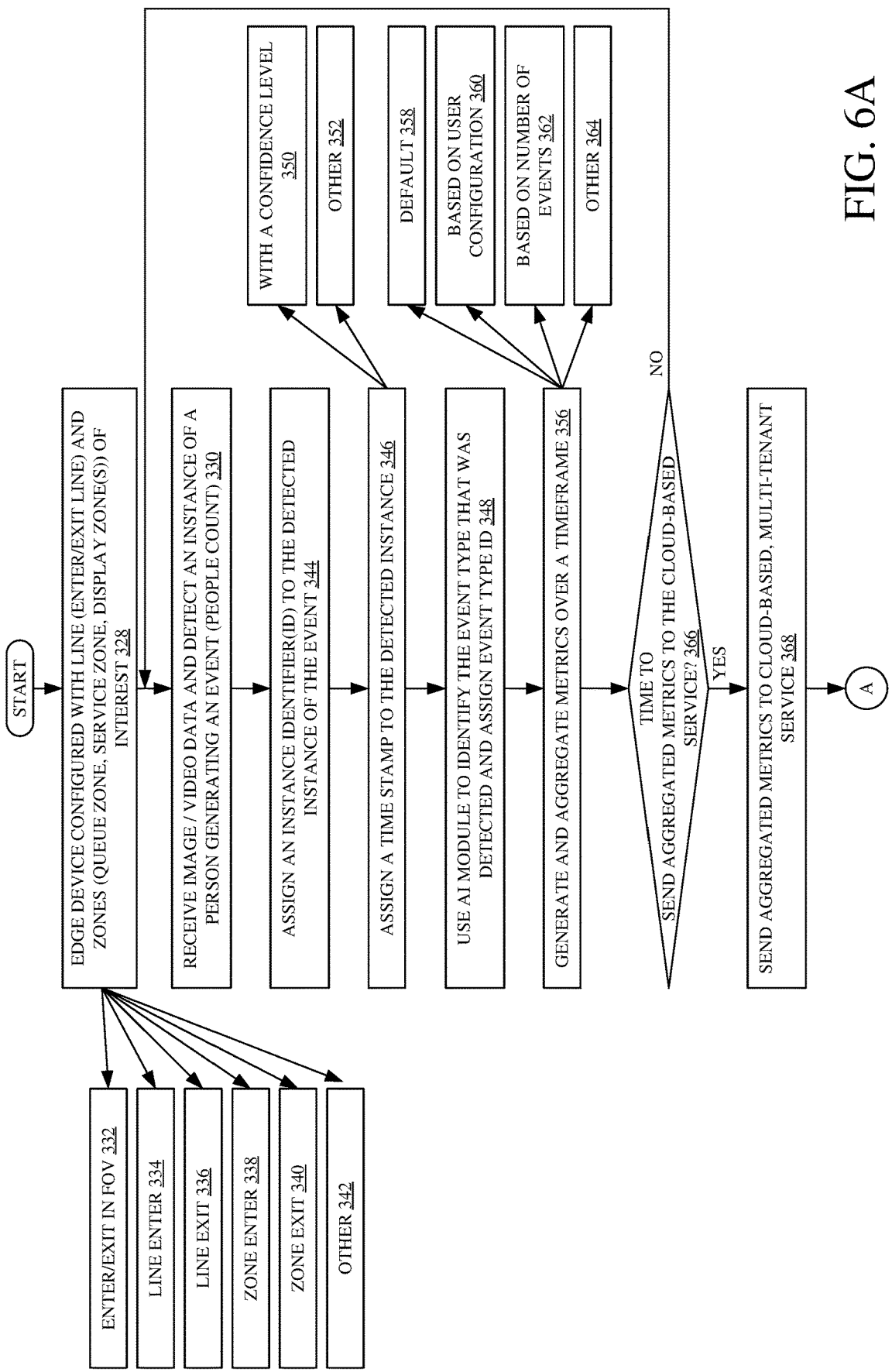
FIGS. 6A and 6B (collectively referred to herein as FIG. 6) illustrate one example of the operation of the architecture illustrated in FIGS. 1 and 2 in performing traffic detection and control.
Figure 6B:
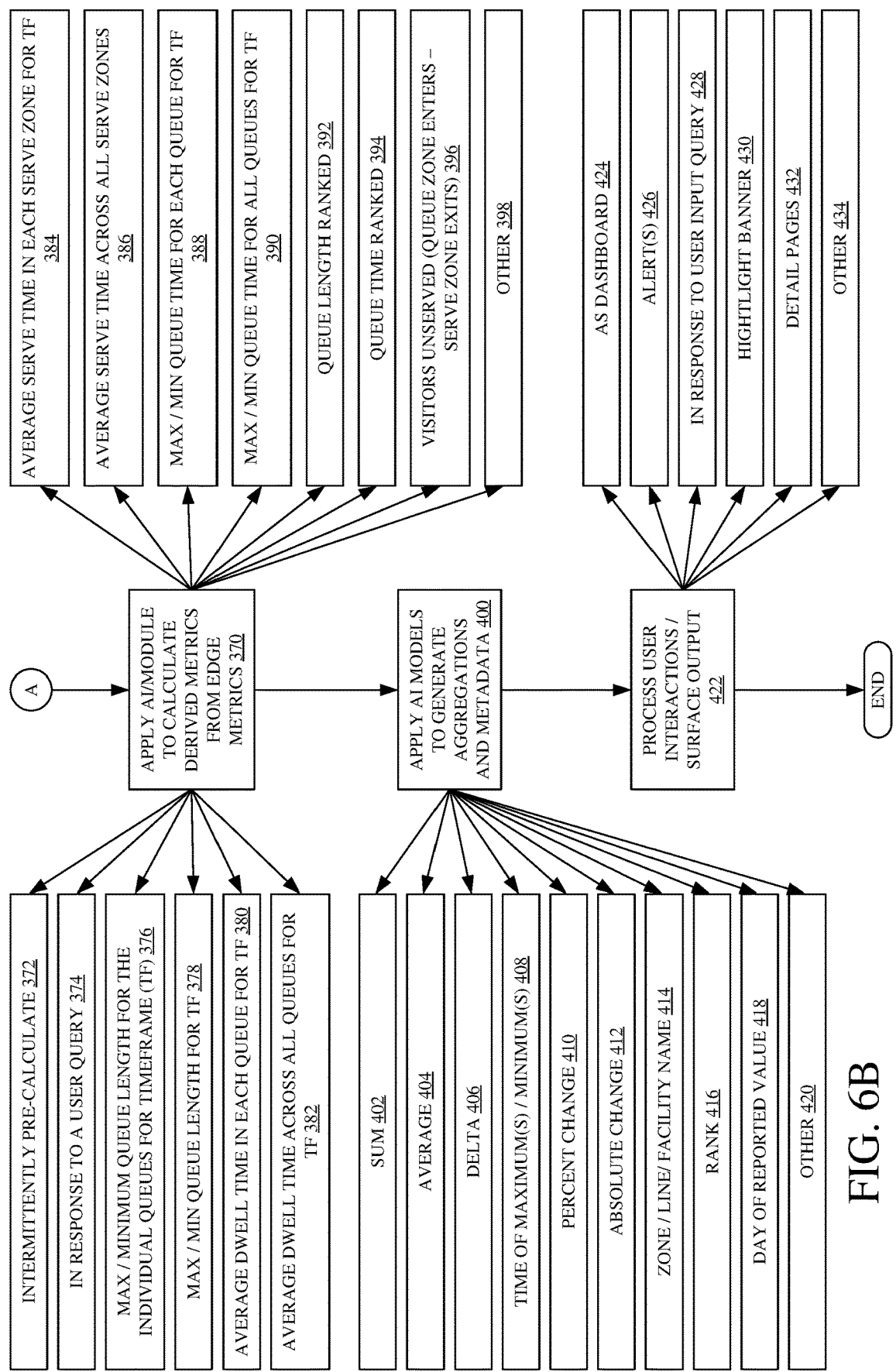

FIGS. 6A and 6B (collectively referred to herein as FIG. 6) show a flow diagram illustrating one example of the operation of architecture 100 in processing video/image data generated by cameras 112-114 in order to detect events related to queue management, and to generate metrics based upon those detected events that can be surfaced for tenant user 104. It is first assumed that the edge computing system 110 is configured with line (enter/exit line) and zone (queue zone, service zone, display zone) configurations so that events can be detected relative to those lines and/or zones of interest. This is indicated by block 328 in the flow diagram of FIG. 6.

AI image/video processing system 130 receives image/video data from cameras 112-114 and detects an instance of a person generating an event. This is indicated by block 330. In one example, the event can be that a person enters or exits the field of view of a camera. This is indicated by block 332. It can be a line enter or line exit event in which case the person is detected crossing a line in an entry direction (in which case the person is entering a queue or service zone of interest) or in the exit direction (in which case the person is exiting the queue zone or service zone of interest). Detecting line enter and exit events is indicated by blocks 334 and 336, respectively.

In another example, the events may be a zone enter or zone exit event in which case the person is detected entering a queue zone or service zone, or exiting that zone. This is indicated by blocks 338, and 340, respectively. The events can be other events (such as direction events, that indicates the direction the person entered from, or exited, etc.). This is indicated by block 342.

The events can be detected using machine learning, machine perception and computer vision modules, and the event type can be identified using a machine learning AI classifier. Enter/exit events can be detected by enter/exit event detector 178. Line crossing events can be detected by line cross event detector 180. Direction events can be detected by direction detector 182.

The detectors in AI image/video processing system 130, once an event is detected, also assign an instance identifier to the detected instance of the event. This serves to uniquely identify the event relative to other events that are detected. This is indicated by block 344. System 130 also assigns a timestamp to the detected instance, indicating when it was detected. This is indicated by block 346. An AI module or other module in system 130 can identify the event type that was detected and assign an event type identifier. This is indicated by block 348. The system 130 can also assign a confidence level indicating the confidence level that the particular AI module has that the event was detected and was of the specified event type. This is indicated by block 350. The event type can be detected and the event type identifier can be assigned in other ways as well, and this is indicated by block 352.

In another example, AI image/video processing system 130 assigns a spatial identifier identifying the zone or line of interest where the event occurred. Thus, the event can be identified as corresponding to a particular zone or line. This is indicated by block 354.

AI metric generation system 132 then generates and aggregates metrics 122 over various timeframes defined by timeframe processor 188. This is indicated by block 356. The particular metrics that are generated may be default metrics as indicated by block 358, or metrics defined based on user configuration inputs, as indicated by block 360. The aggregation of metrics can be performed based upon the number of events for each particular line or zone of interest, as indicated by block 362. For instance, it may be that events are aggregated in batches, or otherwise based upon the number of events that occur. The metrics can be generated and aggregated over a timeframe in a wide variety of other ways as well, and this is indicated by block 364.

The metrics can be provided to communication system 134 and/or stored in data store 126. At some point, communication system 134 provides metrics 122 to multi-tenant service computing system 102. As mentioned above, this can be done periodically or otherwise intermittently, or in response to a request from system 102, or in other ways. Until it is time to send the aggregated metrics 122 to system 102, processing then reverts to block 330 where additional events may be detected, assigned an instance identifier and timestamp, and event type, and a spatial ID, and aggregated. However, if, at block 366, it is determined that it is time to send the aggregated metrics 122 to the multi-tenant service computing system 102, then communication system 134 sends metrics 122 to service computing system 102. This is indicated by block 368.

Multi-tenant service computing system 102 then applies the AI service modules 142 to calculate derived metrics and other information from the edge metrics 122 generated by edge computing system 110. This is indicated by block 370 in the flow diagram of FIG. 6. The AI service modules 142 can be intermittently applied to metrics 122 after they are aggregated at multi-tenant service computing system 102, or they can be substantially continuously applied as metrics 122 are received or they can be applied in response to a query from tenant user 104. Intermittently pre-calculating the information using AI service modules 142 is indicated by block 372. Applying modules 142 in response to a user query is indicated by block 374.

In the example being discussed with respect to FIG. 6, traffic flow (queue management) detection and control component 194 is applied to the metrics 122 received from edge computing system 110. Component 192 can be a machine learning AI module. The component 194 can thus generate a wide variety of different types of information. For instance, it can identify maximum and minimum queue lengths for all individual queue zones detected by cameras 112-114 over a desired timeframe. This is indicated by block 376. Component 194 can calculate the maximum and minimum queue length, over all queues, as indicated by block 378. Component 194 can identify average dwell time in each queue for the timeframe, and the average dwell time across all queues for the timeframe. This is indicated by blocks 380 and 382 in FIG. 6. Component 194 can identify the average serve time in each serve zone for the timeframe and the average server time across all serve zones. This is indicated by blocks 384 and 386 in FIG. 6.

Component 192 can identify the maximum and minimum queue times for each queue over the timeframe as well as the maximum and minimum queue time for all queues over the timeframe. This is indicated by blocks 388 and 390, respectively.

Component 194 can also identify the average queue lengths, over the timeframe, for each queue and rank those queue lengths. It can also do the same for dwell time in each queue. This is indicated by blocks 392 and 394, respectively. Component 194 can identify visitors that were unserved over the timeframe. This may be represented as a number of people who enter a queue zone less the number of people that exit the queue zone and enter the server zone. This is indicated by block 396. For instance, if a visitor enters a queue zone, but exits the queue zone without entering the server zone, or if the person exits the server zone in a particular direction, this means that the person abandoned the queue and went in a different direction. Component 194 can identify a variety of other derived metrics, patterns and information as well. This is indicated by block 398.

In addition, component 194 can be applied to generate aggregations and other metadata corresponding to the metrics 122 under analysis. This is indicated by block 400. Some of the aggregations and metadata that can be generated for the metrics include a sum 402, an average 404, a delta (meaning differences between adjacent values or between values and the average, etc.) 406, maximums and minimums 408, percent changes over time 410, absolute changes 412, zone and event names 414, ranks 416, day of reported value 418, among a wide variety of other information 420.

The information is then stored in tenant data store 144 and user interface system 148 can detect user interactions by tenant user 104 in order to surface the data. User interface system 148 and tenant applications 146 process those user interactions to surface an output of the information for tenant user 104. This is indicated by block 422. The output can take a wide variety of user interactive forms, such as a dashboard 424, alerts 426, it can be output in response to a user query 428, it can include a banner of values 430, detail pages 432, and a wide variety of other output mechanisms 434.

Figure 7:
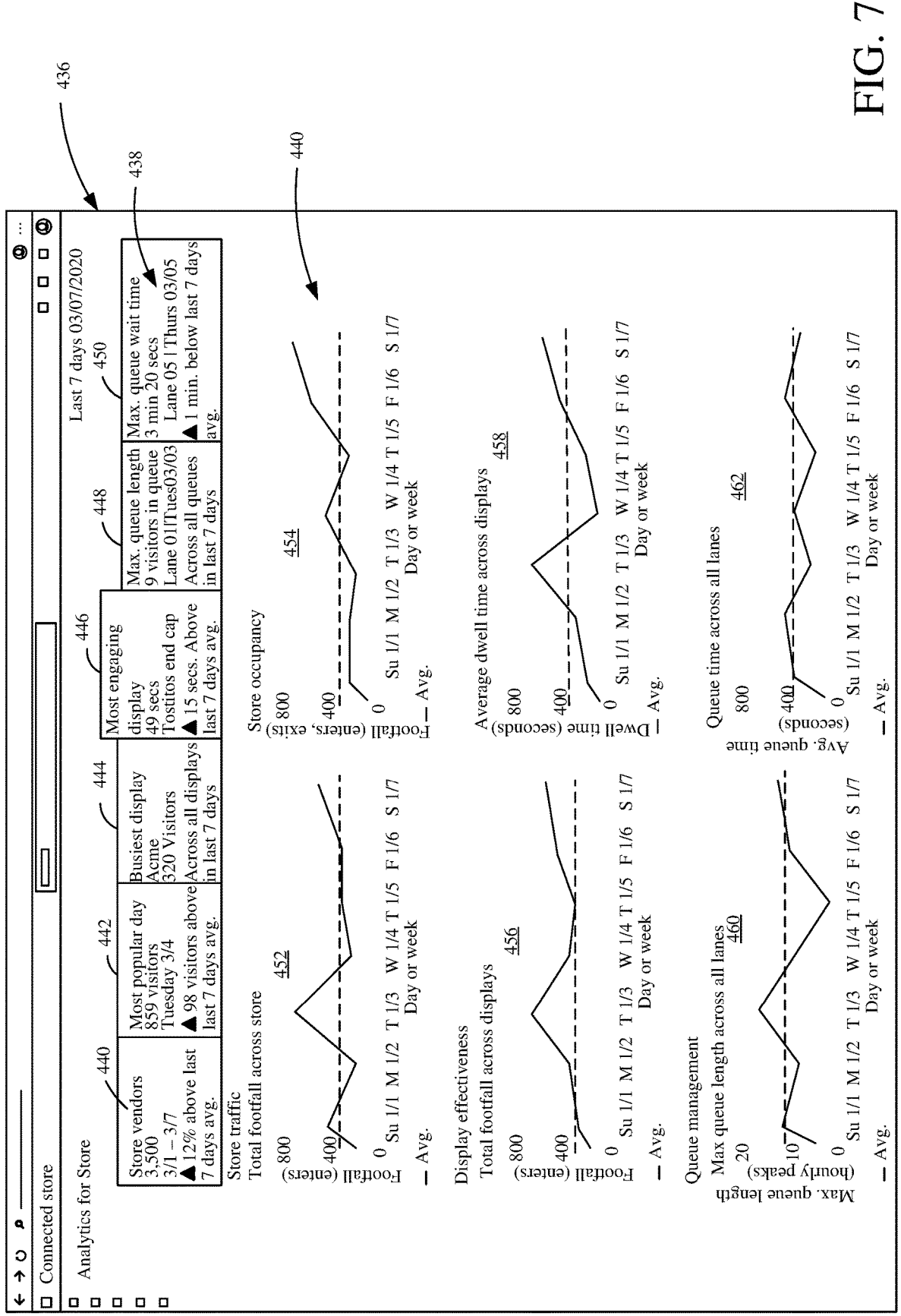
FIGS. 7, 8 and 9 show examples of user interactive interfaces that can be generated.

FIG. 7 is one example of a user interface display 436 that shows a weekly view with week over week comparisons and day-of-week time resolution. It can be seen that display 436 includes a banner portion 438, and a data visualization portion 440 which includes a plurality of different graphical representations of different combinations of the data. Banner portion 438 includes a plurality of different data card display elements. They include a store visitors display element 440, a maximum visitors display element 442, a busiest display element 444, a most engaging display element 446, a maximum queue length display element 448, and a maximum queue wait time display element 450. These are examples, and a wide variety of other information can be displayed as well.

In the graphical data visualization portion 440, there are a plurality of graphical display elements 452 and 454 displaying information corresponding to store traffic. There are also a plurality of graphical display elements 456 and 458 that display information corresponding to display effectiveness. Further, there are a plurality of graphical display elements 460 and 462 that display information corresponding to queue management. Graphical display element 460 shows the maximum queue length across all lanes (queue zones) over a week. Graphical display element 462 shows the queue time across all lanes (queue zones) over the week.

Figure 8:
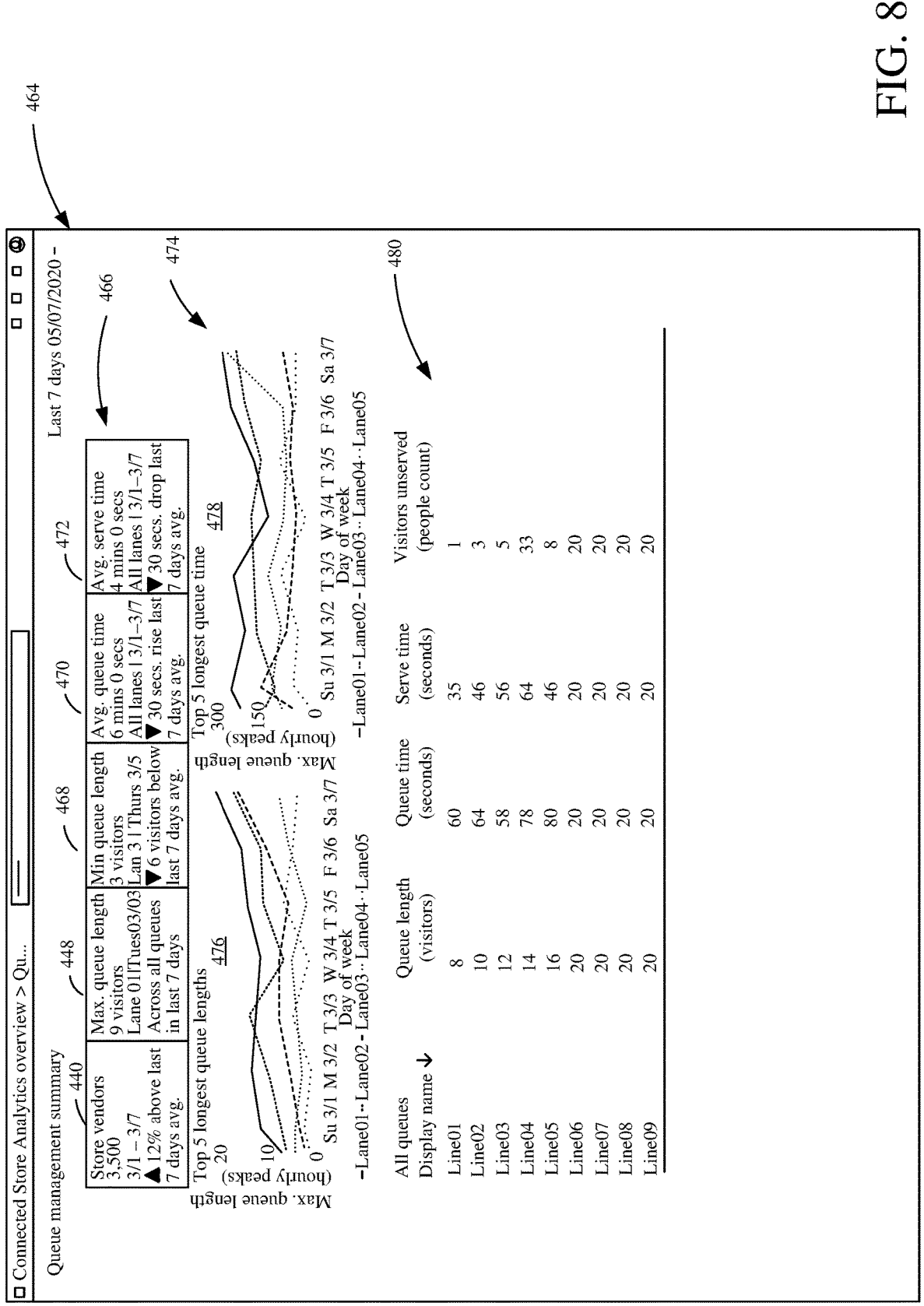

FIG. 8 shows another example of a user interface display 464 that a user 104 can navigate to by providing a user input on display 436, or in other ways. Display 464 is a queue management summary display that includes a banner section 466 with data cards or display elements corresponding to queue management. They include display element 440 described above with respect to FIG. 7 as well as display element 448 that was also discussed above. However, banner portion 466 also includes a minimum queue length display element 450, an average queue time display element 452, and an average serve time display element 454. The average serve time display element 454 shows the average amount of time that a person spent in the server zones. The data visualization section 474 shows a graphical display element 476 that shows the top five longest queue lengths over the week and graphical display element 478 that graphs the top five longest queue times over the week. A tabular display element 480 shows data (queue length, queue time, serve time and visitors unserved) plotted for each of a plurality of different queue and serve zones (identified as lanes).

Figure 9:
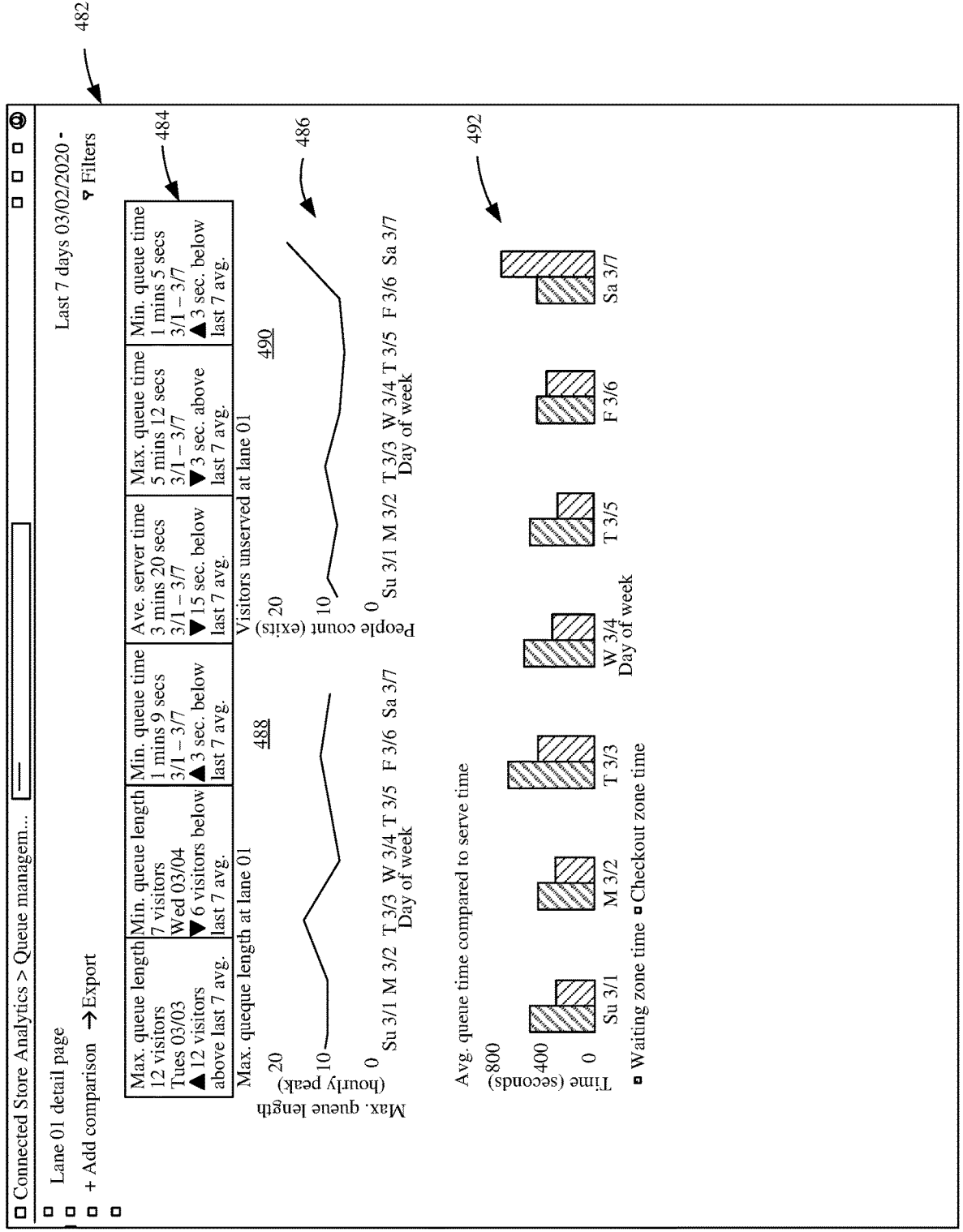

By actuating one of the lanes in FIG. 8, the user 104 can be navigated to a lane detail page shown as 482 in FIG. 9. Again, the lane detail page can include a banner section 484 for the selected lane, and a graphical visualization section 486. The graphical display section 486 includes graphical display elements 488 and 490, and a set of bar graph display elements 492. Display element 488 graphically illustrates the maximum queue length in lane 1, over a week while graphical display element 490 shows the number of visitors unserved in lane 1, over the week. The bar graph display element 492 shows the average queue time compared to serve time, for each day of the week.

It will be appreciated that FIGS. 7-9 are only examples of the various different types of displays that can be surfaced, using tenant applications 146, for user 104, based upon the results of the different artificial intelligence processing performed by systems 130, 132 and queue detection and control component 194. Other interactive displays can be generated as well.

Figure 10:
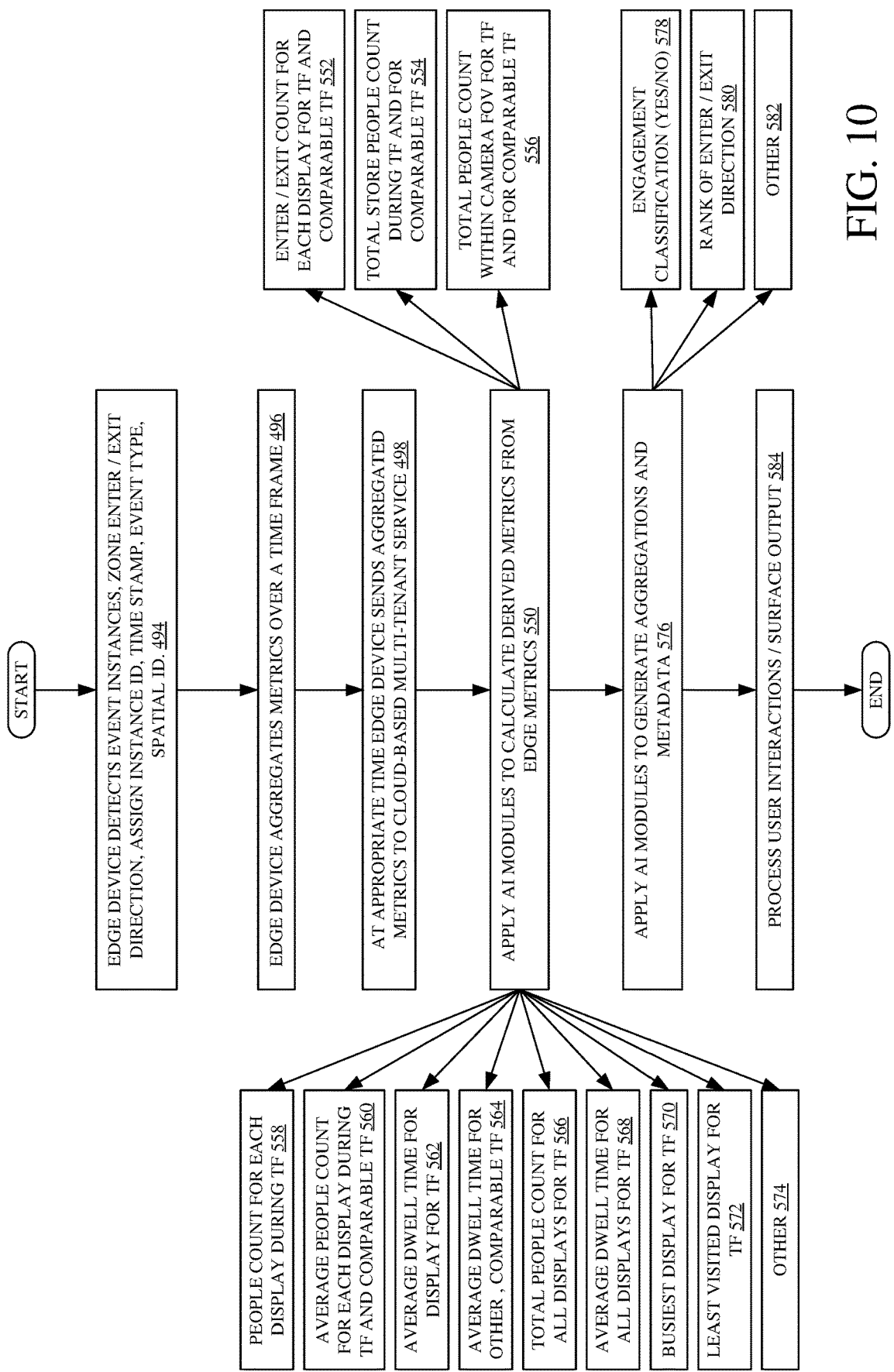
FIG. 10 is a flow diagram illustrating one example of the operation of the architecture illustrated in FIGS. 1 and 2 in performing traffic flow detection and control (queue management).

FIG. 10 is a flow diagram illustrating one example of the operation of architecture 100 in detecting events and applying artificial intelligence service modules to generate information corresponding to display effectiveness. It is first assumed that the edge computing system 110 detects event instances, assigns instant identifiers, timestamps, event types, zone enter/exit direction and spatial identifiers based upon the incoming images and video streams from cameras 112-114. This is indicated by block 494 in the flow diagram of FIG. 10. It is also assumed that AI image/video processing system 130 and AI metric generation system 132 on edge computing system 110 generate and aggregate metrics over a timeframe. This is indicated by block 496. At some point, communication system 134 sends the aggregated metrics 122 to the multi-tenant service computing system 102. This is indicated by block 498.

Then, because the present discussion is proceeding with respect to display effectiveness (dwell time at various displays), dwell time detection and control component 196 is applied to the metrics 122 under analysis. This is indicated by block 550 in the flow diagram of FIG. 10. Component 196 generates additional derived metrics and other information based upon the aggregated metrics 122. The additional metrics can include an enter/exit people count for each display zone for a timeframe and comparable timeframes. This is indicated by block 552. The information can include total store people count during the timeframe and for comparable timeframes over the week (or other period of time). This is indicated by block 554. The information can include a total people count within the camera field of view, which includes the display zones of interest, for the timeframe and comparable timeframe. This is indicated by block 556. The information can include the people count for each display (people residing in the display zone for a threshold time) as indicated by block 558. It can include the average people count for each display (in each display zone) during the timeframe and comparable timeframes, as indicated by block 560. The information generated by component 196 can include the average dwell time for each display zone over the timeframe as indicated by block 562, and the average dwell time for other comparable time frames as indicated by block 564. The information generated by component 196 can include the total people count for all display zones over the timeframe and the average dwell for all display zones over the timeframe. This is indicated by blocks 566 and 568, respectively. The information can identify the busiest display zone over the timeframe, as indicated by block 570, and the least visited display zone, as indicated by block 572. The information generated by component 196 can include a wide variety of other information 574, as well.

The AI dwell time detection and control component 196 also applies modules to generate aggregations and other metadata. This is indicated by block 576. The metadata can be similar to that described above with respect to FIG. 6, and it can also include an engagement classification (e.g., yes or no) 578. For instance, if the person who entered the display zone dwells long enough that it is believed that person is engaged with the display, then the classification module outputs an indicator showing that engagement was positive. The aggregations and metadata can also include a rank of enter/exit direction showing how often people entered and exited the display zone under analysis from different directions. This is indicated by block 580. The aggregations and metadata can include a wide variety of other items 582 as well.

Again, the tenant applications 146 can surface the information generated by component 196 from tenant data tore 144 for tenant 104. The tenant 104 can interact with the surfaced information (such as by clicking links, navigation buttons, etc.) and the tenant applications 146 and user interface system 148 process those user interactions to navigate user 104 to different information. Processing user interactions and surfacing an output for user 104 is indicated by block 584 in the flow diagram of FIG. 10.

Figure 11:
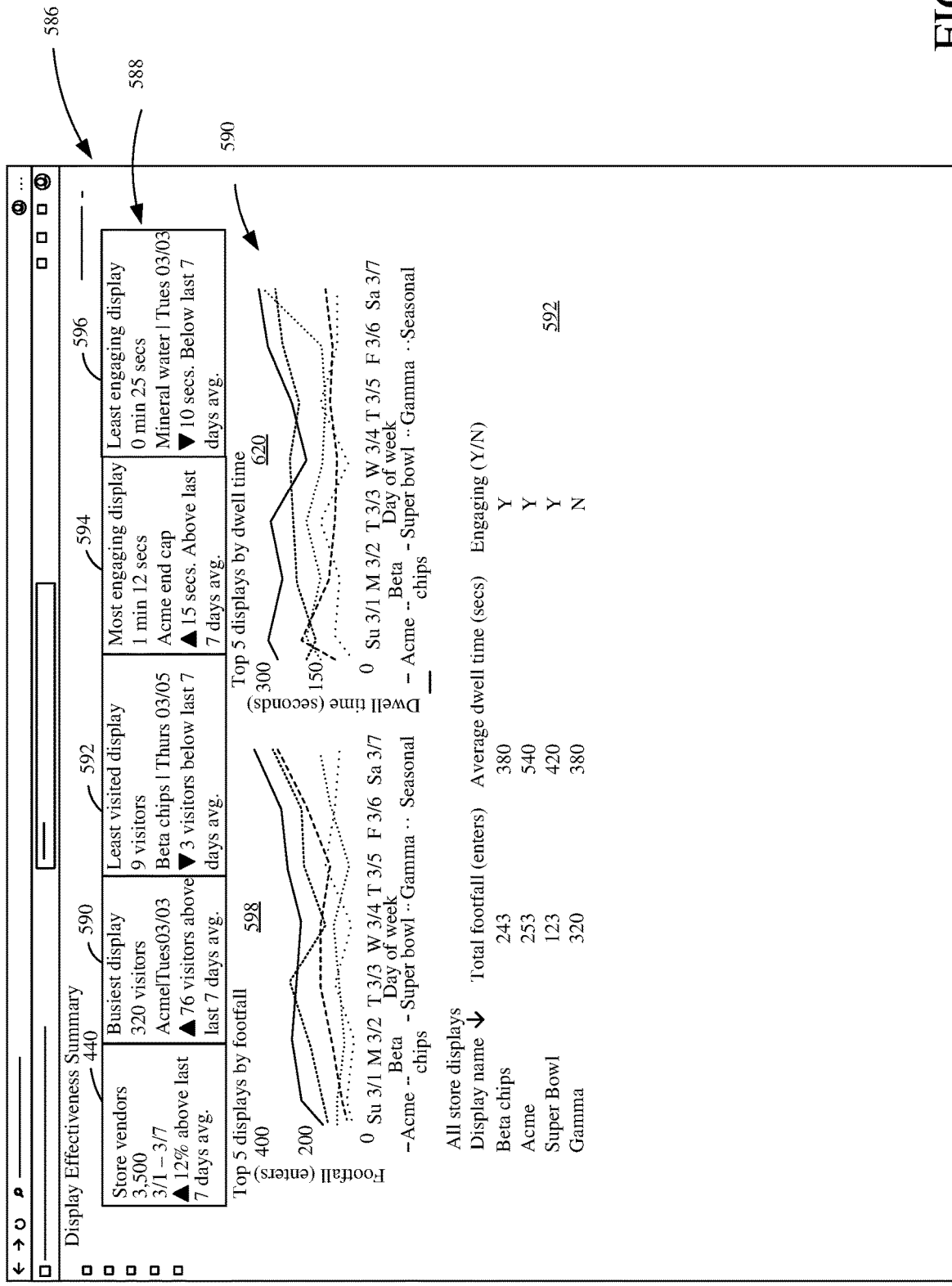
FIGS. 11, 12 and 13 show examples of user interactive interfaces that can be generated.
Figure 12:
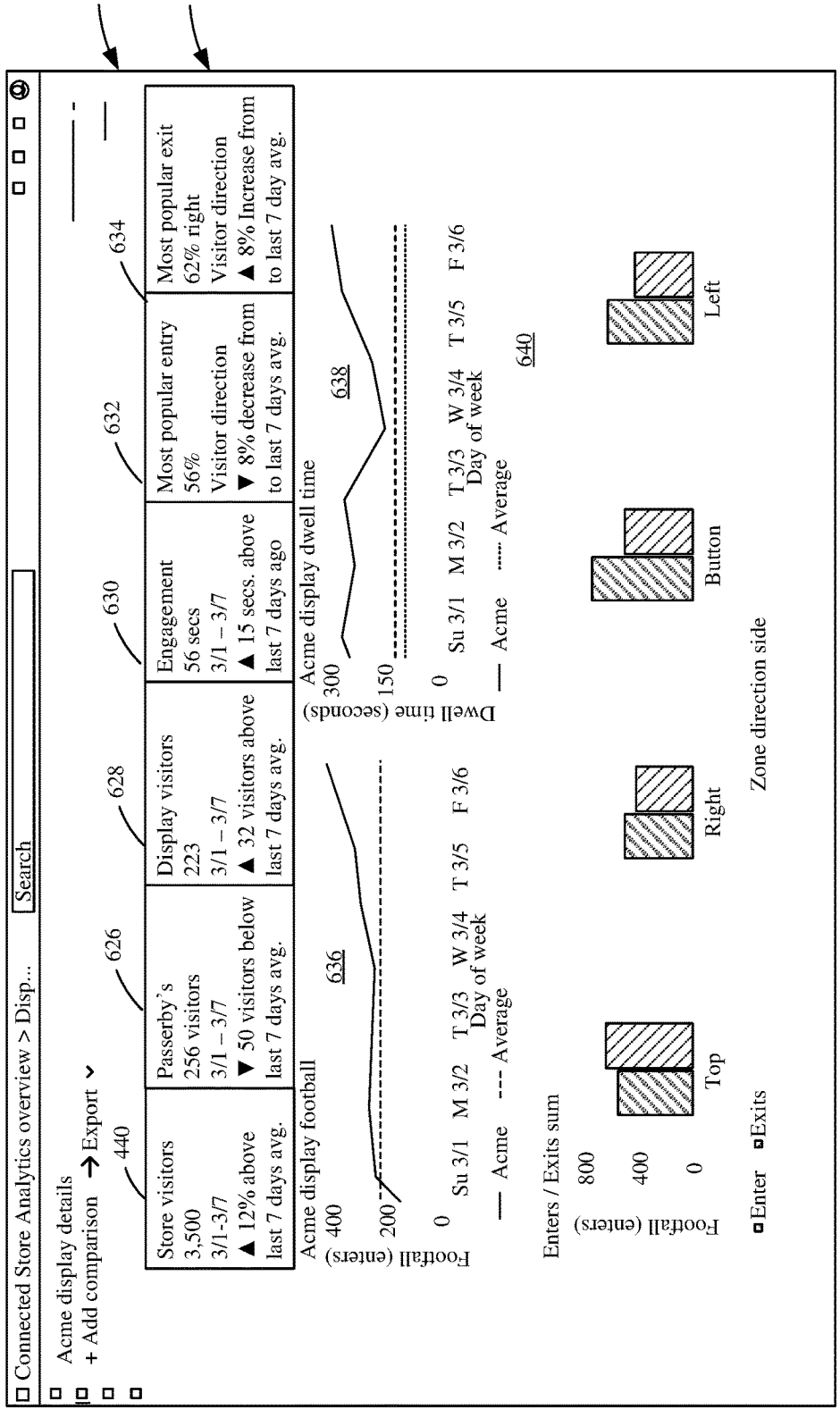
Figure 13:
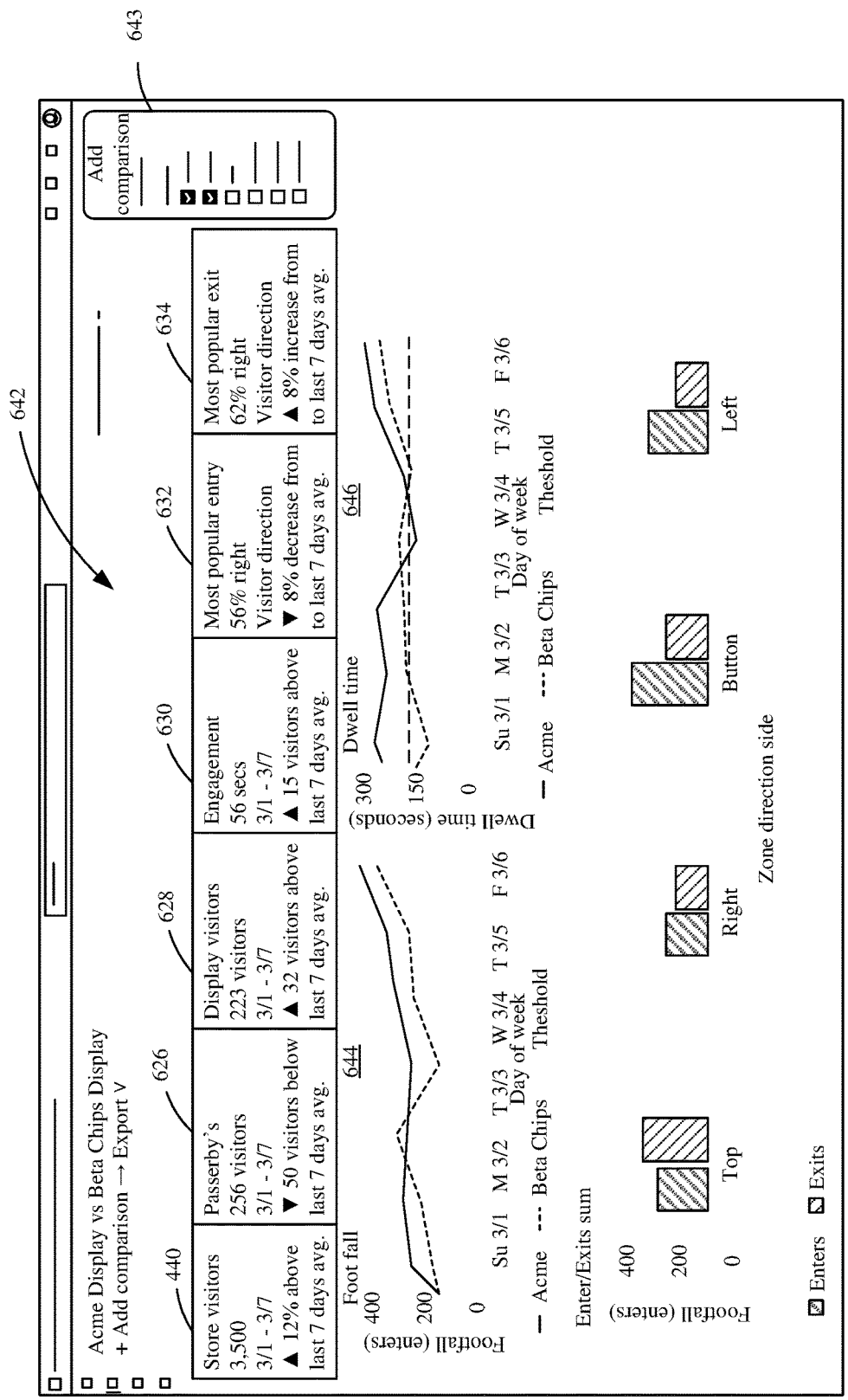

FIGS. 11-13 show various examples of interactive displays that can be generated for user 104 to show display effectiveness information output by the AI modules. FIG. 11 shows a user interface display 586 that has a banner section 588, a graphical visualization section 590, and a tabular visualization section 592. Banner section 588, in the example shown in FIG. 11, includes a display element 590, that shows the busiest display over the timeframe, and display element 592 that shows the least visited display over the timeframe. Display element 594 identifies the most engaging display (where people had the greatest dwell time in the corresponding display zone) and the least engaging display shown by element 596. Graphical display element 598 shows the top five displays by footfall (people count) over the week and display element 620 shows the top five displays by dwell time over the week. Tabular display element 592 shows data elements (such as people count or footfall), dwell time, and engagement classification for a plurality of different displays. Thus, this information allows user 104 to easily identify the most and least effective displays by footfall and engagement, to visualize footfall (people count) and dwell time trends for the top N performing displays, and to select items for more detailed displays. It also allows user 104 to sort through a list of all store displays (display zones) configured for similar information.

FIG. 12 shows a more detailed display page 622 which user 104 can navigate to by providing a user input requesting more detail for a single display (or display zone). Again, display 622 includes a banner display portion 624 that shows display elements for the selected display. Display element 626 shows the number of visitors that pass by the display zone (e.g., the number of visitors detected in the camera field view) and display element 628 shows the number of visitors that visited the display zone. Display element 630 shows the average dwell time (or engagement time) while display elements 632 and 634 show the most popular entry direction into the display zone and the most popular exit directions out of the display zone. Graphical display elements 636 and 638 show the number of persons that entered the display zone over the week and the dwell times for those people, respectively. Graphical display element 640 shows bar graphs comparing the entries and exits from the display zone, by direction.

FIG. 13 shows a user interface display 642 that is generated in response to user 104 actuating a user input mechanism to compare the performance of two display zones. Most items are similar to those shown in FIG. 12, and they are similarly numbered. However, to illustrate an example of comparison, user interface display 642 includes graphical display elements 644 and 646 which compare the alpha and beta chip displays in terms of footfall (or people count) over the week and the average dwell time of those people, respectively. This is just one example of how information can be compared, selectively, based upon an input from user 104, and substantially all of the other display elements can be configured to compare data in this way as well. Display 642 also includes a selection portion 643 that allows user 104 to select different displays for comparison.

Figure 14:
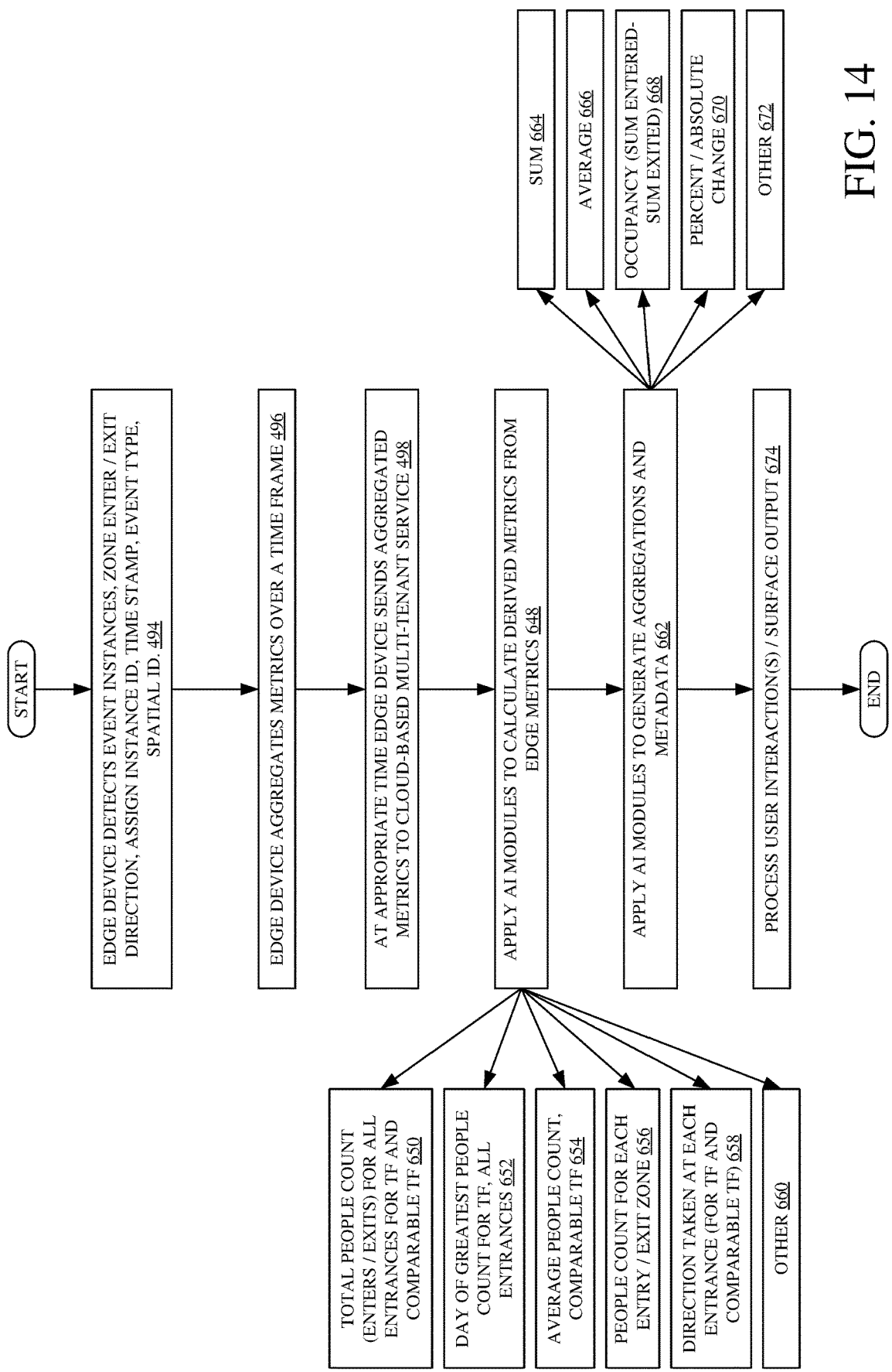
FIG. 14 is a flow diagram illustrating one example of the operation of the architecture shown in FIGS. 1 and 2 in performing dwell time detection and control (display effectiveness processing).

FIG. 14 is a flow diagram illustrating one example of the operation of architecture 100 in performing artificial intelligence analysis on images and video streams to detect events indicative of store traffic (e.g., the number of people entering and exiting through different entries and exits in a physical facility 111). It can be seen that the first three blocks in the flow diagram of FIG. 14 are similar to those shown in FIG. 10, and they are similarly numbered. Once the metrics are received at AI service modules 142, those AI modules are applied to calculate derived metrics from the edge metrics 122 that have been received. This is indicated by block 648 in the flow diagram of FIG. 14. Those derived metrics can include the total people count (in terms of entering and exiting the facility) for all entrances for the timeframe under analysis and for comparable timeframes. This is indicated by block 650. The metrics can include the day of the greatest people count for the timeframe, for all entrances, as indicated by block 652. The metrics can include the average people count for the timeframe and comparable timeframes, averaged over all entrances. This is indicated by block 654. The metrics can include the people count for each entry and exit zone as indicated by block 656, and the direction taken at each entrance (e.g., as the person enters or exits the store which direction are they headed in or coming from), for each timeframe and comparable timeframes. This is indicated by block 658. The metrics can include a wide variety of other metrics as well, and this is indicated by block 660. Traffic detection and control component 192 then applies modules to generate aggregations and metadata corresponding to the previously generated metrics. This is indicated by block 662. The aggregations can include sums 664, averages 666, occupancy (the sum entered less the sum exited) 668, percent/absolute change in the metrics as indicated by block 670, and a wide variety of other aggregations and metadata, as indicated by block 672. The aggregations and metadata can include some of those mentioned above for other metrics as well.

The information is stored in tenant data store 144 so that it is available to tenant user 104 through tenant applications (solutions) 146. Thus, in one example, user interface system 148 exposes user interface elements that user 104 can interact with in order to access the data. The user interactions are processed and data is surfaced in response, and this is indicated by block 674 in the flow diagram of FIG. 14.

Figure 15:
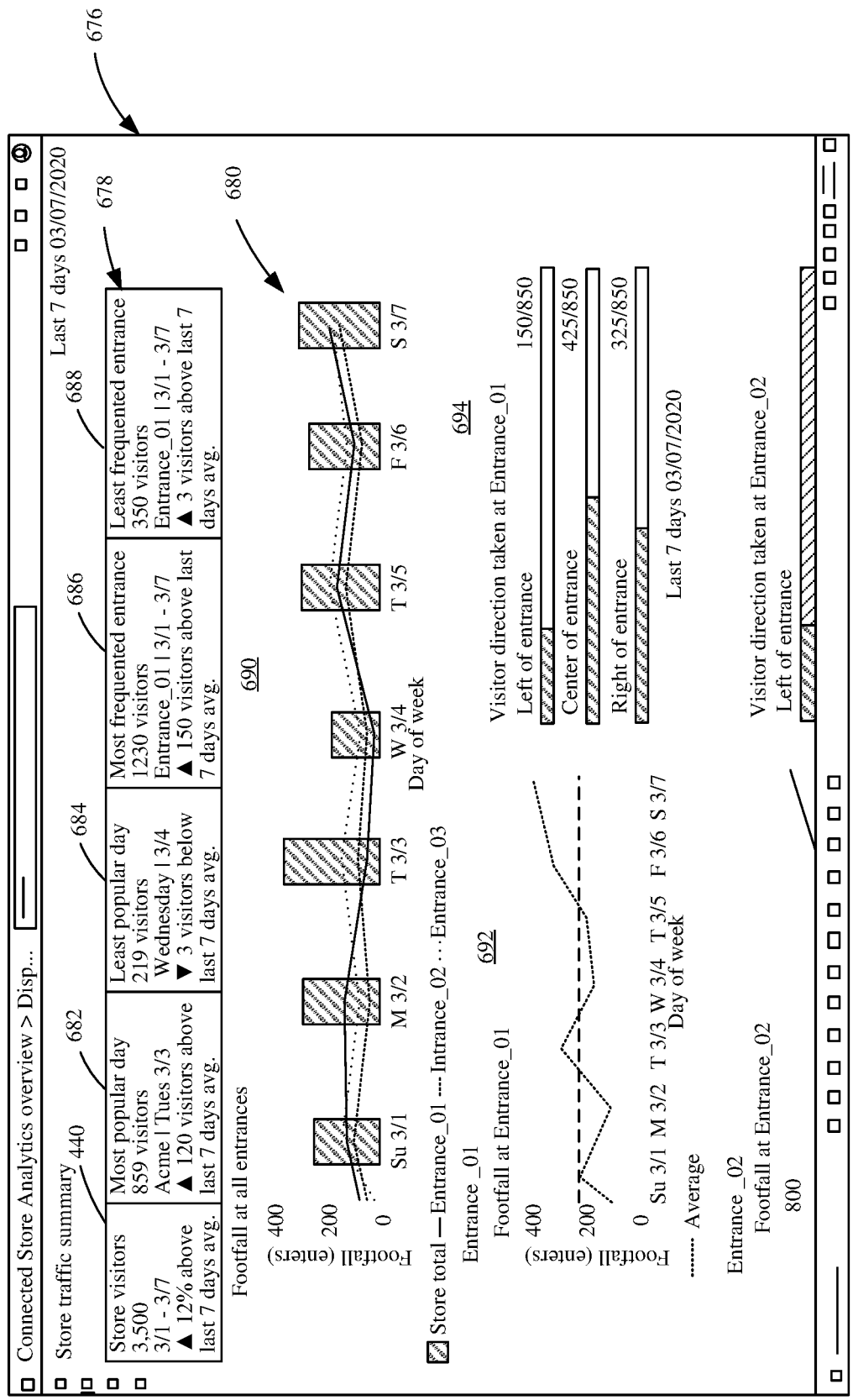
FIG. 15 shows an example of a user interface that can be generated by tenant applications.

FIG. 15 shows one example of a user interface display 676 that shows information corresponding to traffic detection and control in the physical facility 111 from which the data was gathered. Display 676 includes a banner portion 678, and a graphical display portion 680. Banner display portion 678 includes a display element 682 that identifies a most popular day (in terms of people count in the physical facility 111), display element 684 that displays the least popular day, display element 686 that shows a most frequented entrance and display element 688 that surfaces a least frequented entrance. Graphical display element 690 graphs the footfall (people count) through all entrances over a relevant time period (e.g., a week). Graphical display element 692 displays the footfall (people entering) through a particular entrance over the days of the week and graphical display element 694 indicates the number of people that go in each direction (left, center and right) as they enter through the enter/exit zone. Again, these are just examples of the types of information that can be surfaced based on metrics and metadata generated and processed based on people entering and exiting a physical location.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 16:
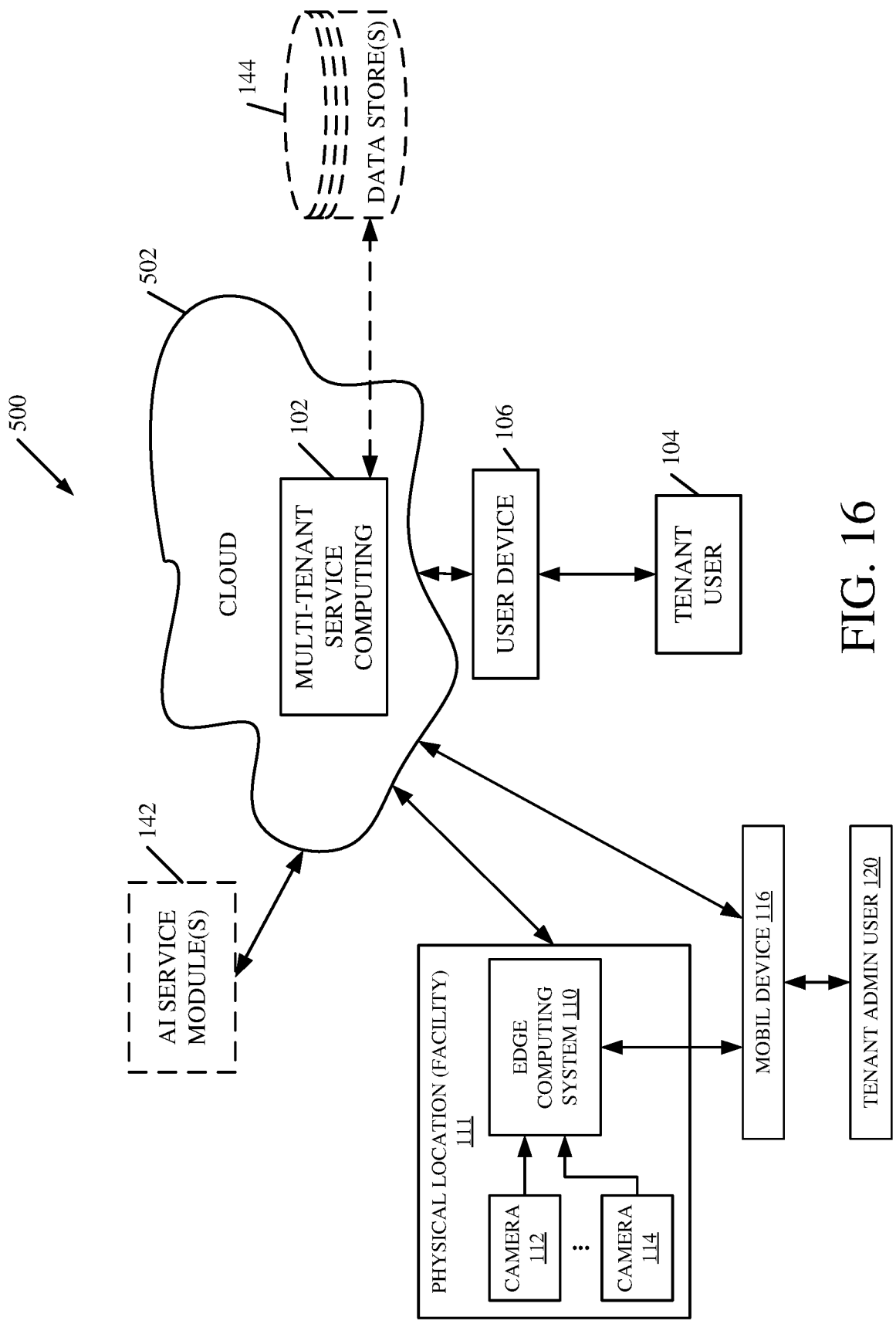
FIG. 16 is a block diagram showing one example of the architecture illustrated in FIG. 1, deployed in a cloud computing architecture.

FIG. 16 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 16, some items are similar to those shown in FIG. 1 and they are similarly numbered. FIG. 16 specifically shows that multi-tenant service computing system 102 can be located in cloud 502 (which can be public, private, or a combination where portions are public while others are private). Therefore, user 104 uses a user device 106 to access those systems through cloud 502.

FIG. 16 also depicts another example of a cloud architecture. FIG. 16 shows that it is also contemplated that some elements of computing system 102 can be disposed in cloud 502 while others are not. By way of example, data store 144 can be disposed outside of cloud 502, and accessed through cloud 502. In another example, AI service modules 142 (or other items) can be outside of cloud 502. Regardless of where they are located, they can be accessed directly by device 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 17:
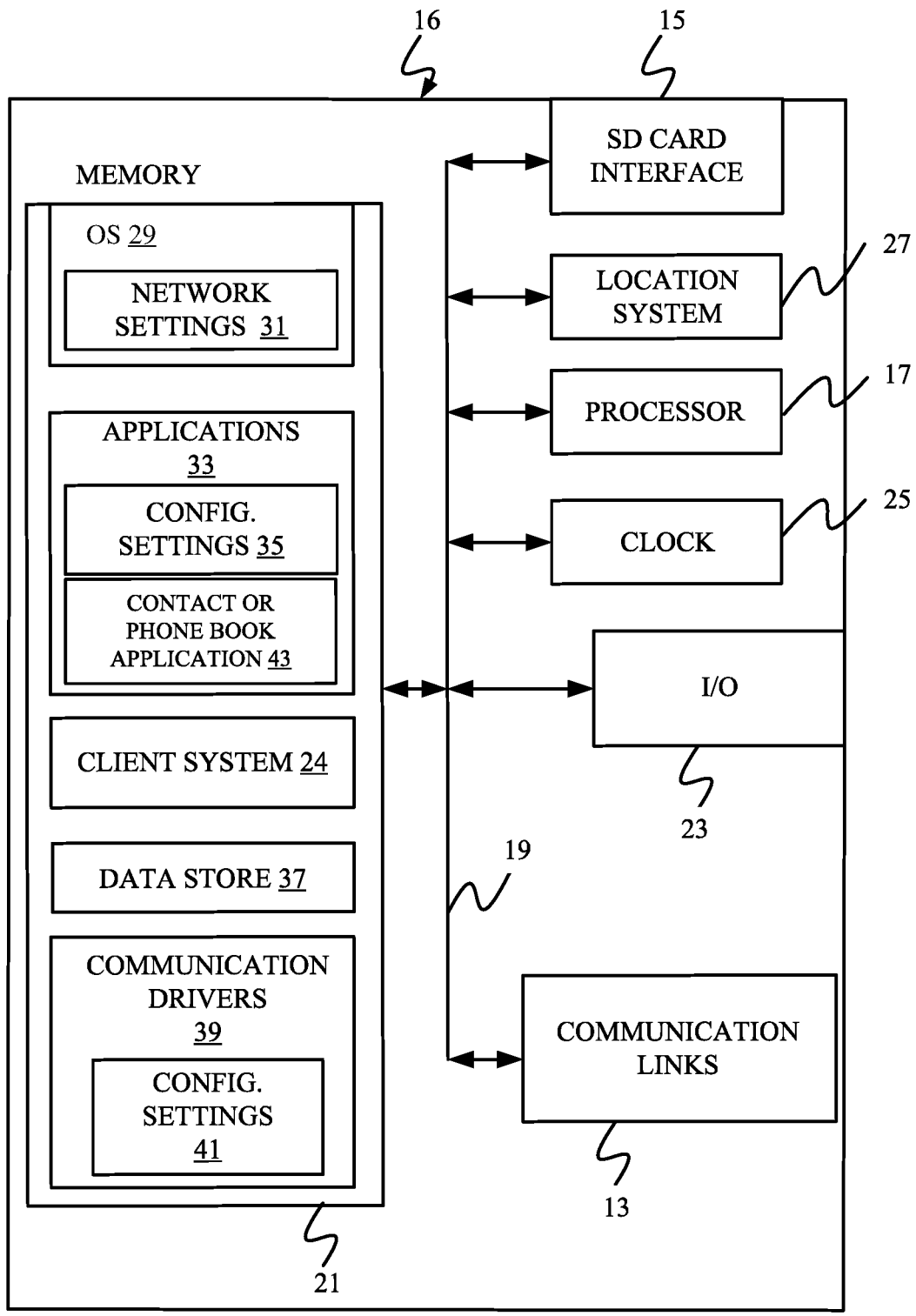
FIGS. 17-19 show examples of mobile devices that can be used in the architectures described herein.
Figure 18:
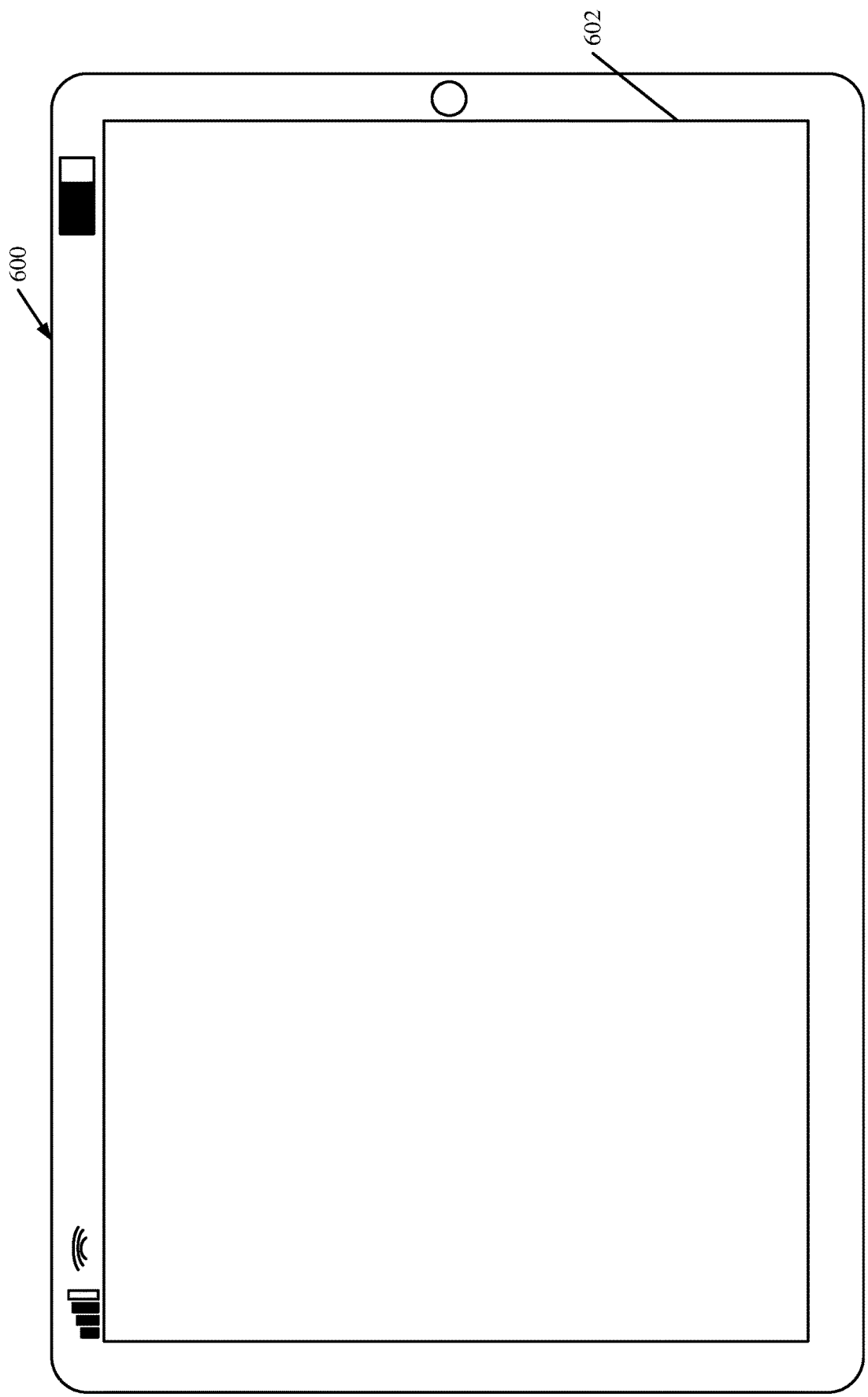
Figure 19:
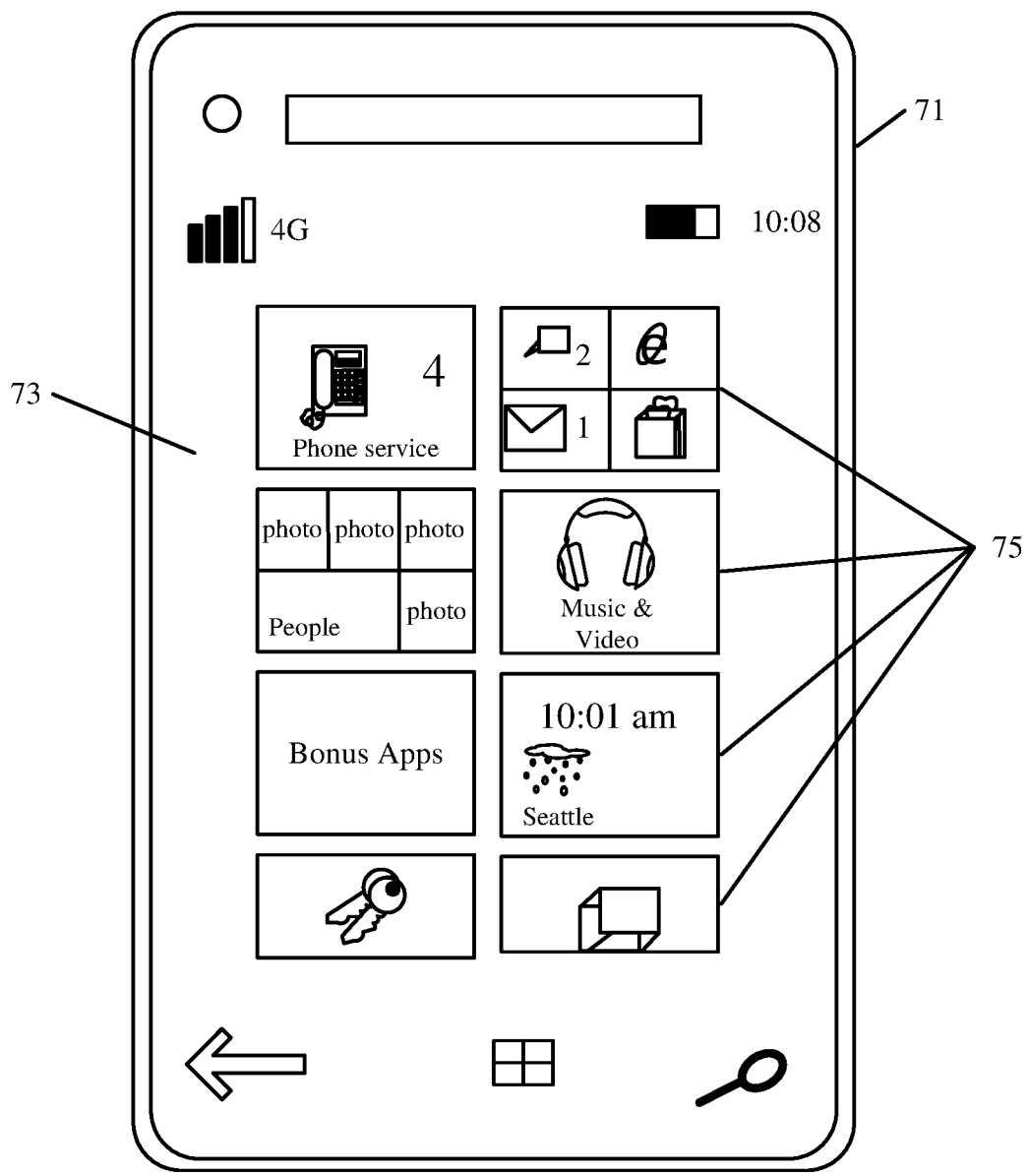

FIG. 17 is a simplified block diagram of one illustrative example of a handheld or mobile computing device that can be used as a user's or client's hand held device 16, in which the present system (or parts of it) can be deployed. For instance, it can be mobile device 116 or another device. FIGS. 18-19 are examples of handheld or mobile devices.

FIG. 17 provides a general block diagram of the components of a client device 16 that can run components of architecture 100 or user device 104, mobile device 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 18 shows one example in which device 16 is a tablet computer 600. In FIG. 18, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 19 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 20:
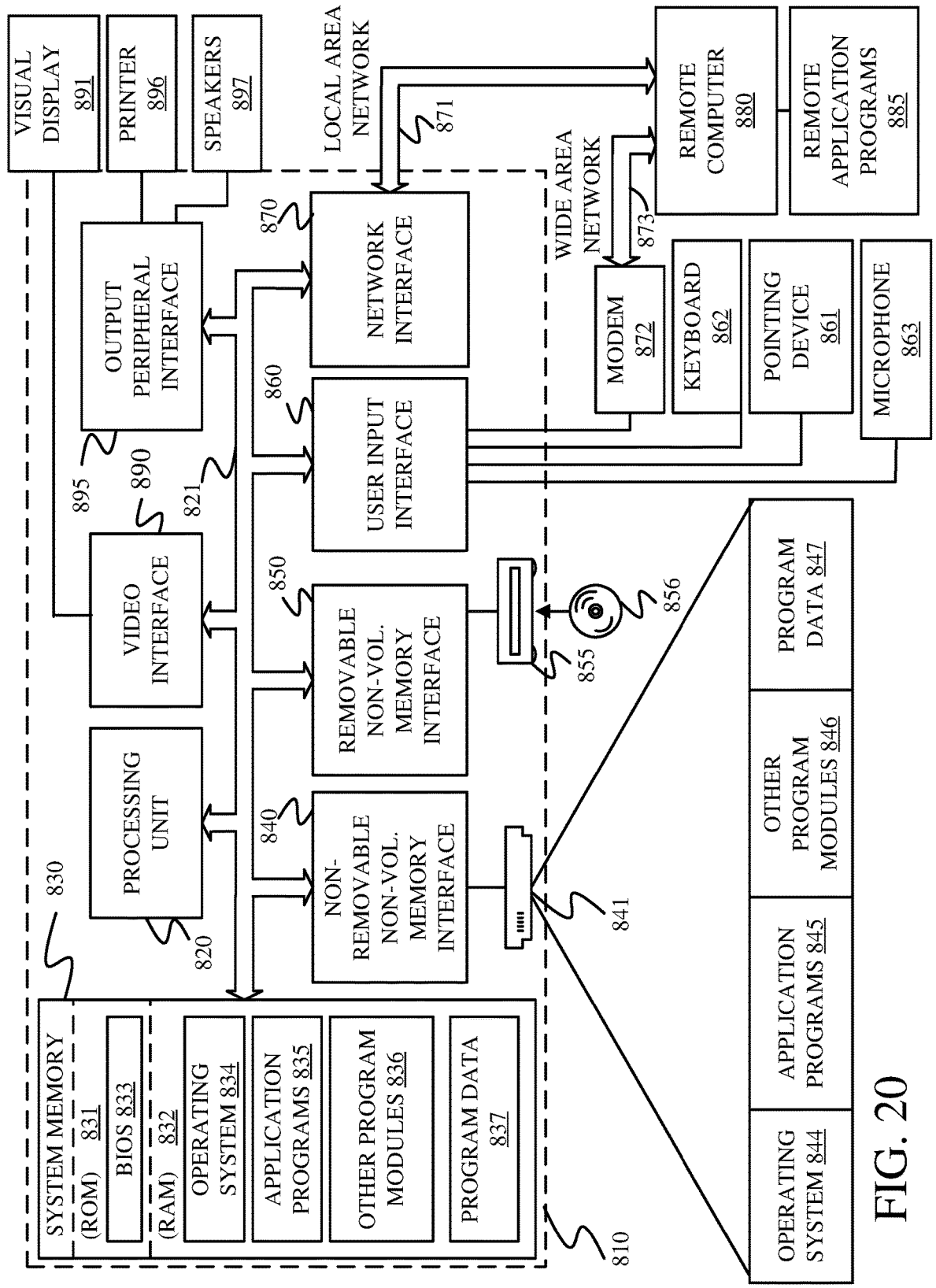
FIG. 20 is a block diagram showing one example of a computing environment that can be used in the architectures described herein.

FIG. 20 is one example of a computing environment in which architecture 100, or parts of it, (for example) can be deployed. With reference to FIG. 20, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 20.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 20 illustrates operating system 834, application programs 835, other program modules 836, and program data 837.

The computer 810 may also include other removable/non-removable volatile/nonvolatile computer storage media. By way of example only, FIG. 20 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 20, provide storage of computer readable instructions, data structures, program modules and other data for the computer 810. In FIG. 20, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 20 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 20 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:

receiving a configuration user input, at an edge computing system deployed at a physical facility, identifying a portion of a field of view of a selected camera, deployed at the physical facility, as a portion of interest;

receiving, at the edge computing system, image data from the camera;

applying an artificial intelligence machine perception module, at the edge computing system, to the portion of interest in the image data to detect, in the portion of interest, person count events corresponding to the portion of interest;

aggregating the person count events to identify a set of metrics, over a timeframe, corresponding to the portion of interest; and sending the set of metrics to a remote server.

Example 2 is the computer implemented method of any or all previous examples wherein aggregating the person count events comprises:

identifying the timeframe; and applying an artificial intelligence metric generation model to aggregate the person count events and to identify anomalies in the person count events, given a history of person count events.

Example 3 is the computer implemented method of any or all previous examples wherein applying the artificial intelligence machine perception module comprises:

applying an artificial intelligence computer vision module to the portion of interest in the image data to detect, in the portion of interest, person count events corresponding to the portion of interest.

Example 4 is the computer implemented method of any or all previous examples wherein receiving a configuration user input identifying a portion of interest of a field of view of the selected camera comprises:

receiving the user input defining a zone of interest in the field of view of the selected camera.

Example 5 is the computer implemented method of any or all previous examples wherein receiving the user input defining the zone of interest comprises:

displaying a user configurable boundary display element, defining a boundary, on a display of the field of view of the camera; and receiving a user manipulation input manipulating the user configurable boundary display element to define the zone of interest.

Example 6 is the computer implemented method of any or all previous examples wherein applying an artificial intelligence machine perception module, at the edge computing system, to the portion of interest in the image data to detect, in the portion of interest, person count events corresponding to the portion of interest, comprises:

detecting a people count event corresponding to the portion of interest;

assigning an event instance identifier to the detected people count event; and assigning a portion identifier identifying the portion of interest in which the people count event is detected.

Example 7 is the computer implemented method of any or all previous examples wherein applying an artificial intelligence machine perception module, at the edge computing system, to the portion of interest in the image data to detect, in the portion of interest, person count events corresponding to the portion of interest, comprises:

applying an artificial intelligence classifier to the detected people count event to identify an event type corresponding to the detected people count event.

Example 8 is the computer implemented method of any or all previous examples wherein applying an artificial intelligence classifier to the detected people count event comprises:

classifying the detected people count event as a zone entry or exit event indicative of a person entering or exiting the portion of interest, respectively.

Example 9 is the computer implemented method of any or all previous examples wherein applying an artificial intelligence classifier to the detected people count event comprises:

classifying the detected people count event as a line crossing event indicative of a person crossing a line in the portion of interest.

Example 10 is the computer implemented method of any or all previous examples wherein applying an artificial intelligence classifier to the detected people count event comprises:

classifying the people count event as a direction event indicative of a direction of movement of a person relative to the portion of interest.

Example 11 is the computer implemented method of any or all previous examples wherein receiving the user input defining a zone of interest in the field of view of the selected camera comprises:

displaying a user configurable boundary display element, defining a boundary, on a display of the field of view of the camera; and receiving a user entry/exit zone configuration input defining an entry/exit zone in an entry/exit location of the physical facility.

Example 12 is the computer implemented method of any or all previous examples wherein receiving the user input defining a zone of interest in the field of view of the selected camera comprises:

displaying a user configurable boundary display element, defining a boundary, on a display of the field of view of the camera; and receiving a user display zone configuration input defining a display zone proximate a physical display at the physical facility.

Example 13 is the computer implemented method of any or all previous examples wherein receiving the user input defining a zone of interest in the field of view of the selected camera comprises:

displaying a user configurable boundary display element, defining a boundary, on a display of the field of view of the camera; and receiving a user queue zone configuration input defining a queue zone proximate a zone in the physical facility in which a queue forms.

Example 14 is the computer implemented method of any or all previous examples wherein receiving the user input defining a zone of interest in the field of view of the selected camera comprises:

displaying a user configurable boundary display element, defining a boundary, on a display of the field of view of the camera; and receiving a user service zone configuration input defining a service zone in the physical facility.

Example 15 is the computer implemented method of any or all previous examples and wherein receiving image data comprises:

receiving, at the edge computing system, a plurality of video streams from a plurality of different cameras deployed at the physical facility.

Example 16 is a computing system, comprising:

one or more processors;

a configuration system receiving a configuration user input identifying a portion of a field of view of a selected camera, deployed at a physical facility, as a portion of interest;

an artificial intelligence image/video processing system receiving image data from the camera and applying an artificial intelligence machine perception module to the portion of interest in the image data to detect, in the portion of interest, person count events corresponding to the portion of interest;

an artificial intelligence metric generation system aggregating the person count events to identify a metric, over a timeframe, corresponding to the portion of interest; and a communication system sending the metric to a remote server.

Example 17 is the computing system of any or all previous examples wherein the artificial intelligence metric generation system comprises:

a time frame processor identifying the timeframe;

an artificial intelligence metric generation module that aggregates the person count events; and an anomaly detector that identifies anomalies in the person count events, given a history of person count events.

Example 18 is the computing system of any or all previous examples wherein the artificial intelligence machine perception module comprises:

an artificial intelligence computer vision module that detects, in the portion of interest, person count events corresponding to the portion of interest.

Example 19 is a multi-tenant service computing system, comprising:

one or more servers;

a communication system that receives a set of metrics generated by an edge computing system artificial intelligence module, deployed at a remote physical facility, operating on image data from a camera deployed at the remote physical facility;

an artificial intelligence service module, implemented by the one or more servers, that identifies, based on the set of metrics, traffic patterns at the remote physical facility, characteristics of queues in queue zones defined at the remote physical facility, and dwell time characteristics corresponding to zones of interest defined at the remote physical facility; and a tenant application that surfaces the traffic patterns, characteristics of the queues and dwell time characteristics based on detected tenant user inputs.

Example 20 is the multi-tenant service computing system of any or all previous examples wherein the communication system receives a set of metrics from edge computing system artificial intelligence modules at a plurality of different physical facilities and wherein the artificial intelligence service module generates an output indicative of a metric comparison across the metrics from the edge computing systems at the plurality of different physical facilities.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   receiving a configuration user input, at an edge computing system deployed at a physical facility, identifying a portion of a field of view of a selected camera, deployed at the physical facility;
   receiving, at the edge computing system, image data from the selected camera;
   applying an artificial intelligence machine perception module, at the edge computing system, to a portion of the image data corresponding to the portion of the field of view;
   detecting person count events corresponding to the portion of the field of view based on perception analysis performed on the portion of the image data by the artificial intelligence machine perception module;
   aggregating the person count events to identify a set of metrics, over a timeframe, corresponding to the portion of the field of view; and
   sending the set of metrics to a remote server.

2. The computer implemented method of claim 1 wherein aggregating the person count events comprises:
   identifying the timeframe; and
   identifying anomalies in the person count events, given a history of person count events, using an artificial intelligence metric generation model.

3. The computer implemented method of claim 1 wherein the artificial intelligence machine perception module comprises artificial intelligence computer vision module, and further comprising:
   detecting, in the portion of the field of view, person count events corresponding to the portion of the field of view based on analyzing the portion of the image data using the artificial intelligence computer vision module.

4. The computer implemented method of claim 1 wherein receiving a configuration user input identifying a portion of the field of view of the selected camera comprises:
   receiving the user input defining a zone of interest in the field of view of the selected camera.

5. The computer implemented method of claim 4 wherein receiving the user input defining the zone of interest comprises:
   displaying a user configurable boundary display element, defining a boundary, on a display of the field of view of the selected camera; and
   receiving a user manipulation input manipulating the user configurable boundary display element to define the zone of interest.

6. The computer implemented method of claim 1 wherein applying an artificial intelligence machine perception module and detecting person count events comprises:
   detecting a people count event corresponding to the portion of the field of view;
   assigning an event instance identifier to the detected people count event; and
   assigning a portion identifier identifying the portion of the field of view in which the people count event is detected.

7. The computer implemented method of claim 6 wherein applying an artificial intelligence machine perception module and detecting person count events comprises:
   identifying an event type corresponding to the detected people count event based on applying an artificial intelligence classifier to the detected people count event.

8. The computer implemented method of claim 7 wherein applying an artificial intelligence classifier to the detected people count event comprises:
   classifying the detected people count event as a zone entry or exit event indicative of a person entering or exiting the portion of the field of view, respectively.

9. The computer implemented method of claim 7 wherein applying an artificial intelligence classifier to the detected people count event comprises:
   classifying the detected people count event as a line crossing event indicative of a person crossing a line in the portion of the field of view.

10. The computer implemented method of claim 7 wherein applying an artificial intelligence classifier to the detected people count event comprises:
    classifying the people count event as a direction event indicative of a direction of movement of a person relative to the portion of the field of view.

11. The computer implemented method of claim 4 wherein receiving the user input defining a zone of interest in the field of view of the selected camera comprises:
    displaying a user configurable boundary display element, defining a boundary, on a display of the field of view of the selected camera; and receiving a user entry/exit zone configuration input defining an entry/exit zone in an entry/exit location of the physical facility.

12. The computer implemented method of claim 4 wherein receiving the user input defining a zone of interest in the field of view of the selected camera comprises:
displaying a user configurable boundary display element, defining a boundary, on a display of the field of view of the selected camera; and
receiving a user display zone configuration input defining a display zone proximate a physical display at the physical facility.

13. The computer implemented method of claim 4 wherein receiving the user input defining a zone of interest in the field of view of the selected camera comprises:
displaying a user configurable boundary display element, defining a boundary, on a display of the field of view of the selected camera; and
receiving a user queue zone configuration input defining a queue zone proximate a zone in the physical facility in which a queue forms.

14. The computer implemented method of claim 4 wherein receiving the user input defining a zone of interest in the field of view of the selected camera comprises:
displaying a user configurable boundary display element, defining a boundary, on a display of the field of view of the selected camera; and
receiving a user service zone configuration input defining a service zone in the physical facility.

15. The computer implemented method of claim 1 and wherein receiving image data comprises:
receiving, at the edge computing system, a plurality of video streams from a plurality of different cameras deployed at the physical facility.

16. A computing system, comprising:
one or more processors;
a configuration system receiving a configuration user input identifying a portion of a field of view of a selected camera, deployed at a physical facility, as a portion of interest;
an artificial intelligence image/video processing system receiving image data from the selected camera and applying an artificial intelligence machine perception module to the portion of interest in the image data to detect, in the portion of interest, person count events corresponding to the portion of interest;
an artificial intelligence metric generation system aggregating the person count events to identify a metric, over a timeframe, corresponding to the portion of interest; and
a communication system sending the metric to a remote server.

17. The computing system of claim 16 wherein the artificial intelligence metric generation system comprises:
a time frame processor identifying the timeframe;
an artificial intelligence metric generation module that aggregates the person count events; and
an anomaly detector that identifies anomalies in the person count events, given a history of person count events.

18. The computing system of claim 16 wherein the artificial intelligence machine perception module comprises:
an artificial intelligence computer vision module that detects, in the portion of interest, person count events corresponding to the portion of interest.

19. A multi-tenant service computing system that hosts a service for a plurality of tenants, the multi-tenant service computing system comprising:
a communication system configured to receive sets of metrics generated by a plurality of edge computing system artificial intelligence (AI) modules at a plurality of different physical facilities of the plurality of different tenants,
each edge computing system AI module corresponding to a respective tenant, of the plurality of different tenants, and being deployed at a remote physical facility of the respective tenant to operate on image data from a camera deployed at the remote physical facility of the respective tenant;
one or more servers configured to:
identify, based on a particular set of the metrics, traffic patterns at a particular remote physical facility corresponding to the particular set of metrics, characteristics of queues in queue zones defined at the particular remote physical facility, and dwell time characteristics corresponding to zone of interest defined a the particular remote physical facility; and
surface the traffic patterns, characteristics of the queues and dwell time characteristics based on detected tenant user inputs.

20. The multi-tenant service computing system of claim 19 wherein the artificial intelligence service module generates an output indicative of a metric comparison across the metrics from the edge computing system AI modules at the plurality of different physical facilities.

* * * * *